(12) United States Patent
Ise et al.

(10) Patent No.: US 6,643,258 B1
(45) Date of Patent: *Nov. 4, 2003

(54) COMMUNICATION RESOURCE MANAGEMENT METHOD AND NODE DEVICE USING PRIORITY CONTROL AND ADMISSION CONTROL

(75) Inventors: Kotaro Ise, Kanagawa (JP); Yoshimitsu Shimojo, Kanagawa (JP); Yasuhiro Katsube, Kanagawa (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,794

(22) Filed: Oct. 22, 1998

(30) Foreign Application Priority Data

Oct. 23, 1997 (JP) .............................................. 9-290767

(51) Int. Cl.[7] .............................................. H04L 12/56
(52) U.S. Cl. ........................ 370/230; 370/231; 370/235; 370/253
(58) Field of Search ................................ 370/230, 231, 370/232, 233, 234, 235, 238, 236, 252, 253, 409, 468, 419, 420, 463, 230.1, 235.1, 236.1, 236.2, 237, 238.1, 241.1; 709/249, 226, 229; 340/825

(56) References Cited

U.S. PATENT DOCUMENTS

| 5,128,932 | A | * | 7/1992 | Li ................................ 370/236 |
| 5,251,209 | A | * | 10/1993 | Jurkevich et al. ............ 370/468 |
| 5,452,287 | A | * | 9/1995 | DiCecco et al. ............. 370/236 |
| 5,838,663 | A | * | 11/1998 | Elwalid et al. .............. 370/233 |
| 5,856,981 | A | * | 1/1999 | Voelker ....................... 714/712 |
| 6,041,039 | A | * | 3/2000 | Kilkki et al. ................ 370/230 |
| 6,084,855 | A | * | 7/2000 | Soirinsuo et al. ........... 370/235 |
| 6,400,681 | B1 | * | 6/2002 | Bertin et al. ................. 370/218 |

FOREIGN PATENT DOCUMENTS

| JP | 8-251201 | 9/1996 |
| JP | 9-018515 | 1/1997 |

OTHER PUBLICATIONS

Clark et al., An Approach to Service Allocation in the Internet, (1997), pp 1–32.
Braden et al., "Resource ReSerVation protocol (RSVP)"— Version 1 Functional Specification, (1997), pp 1–111.
Kilkki et al., "Simple Integrated Media ACCESS (SIMA)", (1997), pp 1–24.
Wroclawski et al., "Specification of the Controlled–Load Network element Service", (1997), pp 1–20.
S. Jamaloddin Golestani, "A Self–Clocked Fair Quenening Scheme for Broadband Applications", Proc. of Infocom (1994), pp 636–646.

* cited by examiner

*Primary Examiner*—Hassan Kizou
*Assistant Examiner*—Saba Tsegaye
(74) *Attorney, Agent, or Firm*—Foley & Lardner

(57) ABSTRACT

A communication resource management scheme capable of guaranteeing the communication quality with respect to the flow while not requiring the processing for each flow to nodes other than edge nodes is disclosed. The edge node stores an information for obtaining an available amount of communication resources that can be newly allocated in the network to one set of flows which share at least a route from that edge node to an egress node of the network. Then, the edge node carries out an admission control by newly receiving a request for allocation of communication resources for one flow belonging to that one set of flows, judging whether or not to accept the request according to a requested amount of communication resources and the available amount of communication resources as obtained from the information stored for that one set of flows, and allocating requested communication resources to that one flow when it is judged that the request is to be accepted, while the edge node and the core node carry out the priority control.

4 Claims, 20 Drawing Sheets

FIG.5

| DESTINATION ADDRESS | NETWORK MASK | ROUTE IDENTIFIER |
|---|---|---|
| 192. 10. 0. 0 | 255. 255. 0. 0 | 1 |
| 193. 20. 10. 0 | 255. 255. 255. 0 | 2 |
| 193. 20. 20. 0 | 255. 255. 255. 0 | 2 |
| 194. 30. 40. 0 | 255. 255. 255. 0 | 3 |
| ⋮ | ⋮ | ⋮ |

FIG.6

| ROUTE IDENTIFIER | ROUTE CAPACITY (kbps) | USED BANDWIDTH (kbps) |
|---|---|---|
| 1 | 1500 | 300 |
| 2 | 1000 | 900 |
| 3 | 700 | 120 |
| ⋮ | ⋮ | ⋮ |

FIG.10

| FLOW IDENTIFIER (FLOW DESTINATION ADDRESS, FLOW DESTINATION NETWORK MASK, FLOW SOURCE ADDRESS, FLOW SOURCE NETWORK MASK) | ALLOCATED BANDWIDTH [kbps] | SOURCE NODE | OUTPUT LINK NUMBER | ROUTE IDENTIFIER |
|---|---|---|---|---|
| (193.20.10.0,255.255.255.0, 0.0.0.0,0.0.0.0) | 900 | CORE NODE 103 | 1 | 2 |
| (193.20.20.10,255.255.255.255, 0.0.0.0,0.0.0.0) | 300 | CORE NODE 101 | 1 | 2 |
| (197.10.9.7,255.255.255.255, 0.0.0.0,0.0.0.0) | 400 | CORE NODE 101 | 2 | 3 |

FIG.17

| OUTPUT LINK NUMBER | LINK CAPACITY [kbps] | USED BANDWIDTH [kbps] |
|---|---|---|
| 1 | 2200 | 1200 |
| 2 | 2000 | 1700 |
| 3 | 1000 | 900 |
| ⋮ | ⋮ | ⋮ |

COMMUNICATION RESOURCE MANAGEMENT METHOD AND NODE DEVICE USING PRIORITY CONTROL AND ADMISSION CONTROL

BACKGROUND OF THE INVENTION

1. Field of the Invention

The present invention relates to a communication resource management method and a node device for the purpose of providing a certain level of communication quality in a packet communication network.

2. Description of the Background Art

In the IP (Internet Protocol) network, for instance, an amount of delay caused for packets will be larger when the number of packets that arrive at a router for carrying out packet transfer becomes larger. In this case, however, each terminal is responsible for making a Judgement as to whether or not to reduce a load of the router by limiting the number of packets to be transmitted from the terminal, and the terminal has no obligation to limit the number of packets to be transmitted.

This is due to the fact that the Internet Protocol is designed without any consideration for guaranteeing the communication quality. For this reason, the IP network basically cannot guarantee the communication quality with respect to a user. However, in order to realize the video image communication, for example, there is a need to guarantee the communication quality such as packet transfer delay, so that there have been many propositions for a scheme that guarantees the communication quality in the IP network.

For instance, in the standardization organization called IETF, the service specification called "Guaranteed Service" (S. Shenker et al., "Specification of Guaranteed Quality of Service", Internet Draft draft-ietf-intserv-guaranteed-svc-08.txt) and the service specification called "Controlled Load Service" (J. Wroclawski, "Specification of the Controlled-Load Network Element Service", Internet Draft draft-ietf-intserv-ctrl-load-svc-05.txt) have been proposed in the Int-Serv working group.

In these schemes, a bandwidth reservation request is notified to each node on the route of a flow, and a node that received the bandwidth reservation request accepts that bandwidth reservation request if there are enough communication resources for guaranteeing the communication quality within that node itself. Then, when packets belonging to a flow that requests the bandwidth arrive, each node on the route carries out the packet policing or packet scheduling according to values of traffic parameters reported for that flow so as to guarantee the communication quality. Here, the flow is defined as a group of packets which share the same destination address, destination port number, source address, source port number and protocol number, according to RSVP (R. Braden et al., "Resource ReSerVation Protocol (RSVP)—Version 1 Functional Specification, Internet Draft draft-ietf-rsvp-spec-16.txt), for example.

As an example of the scheduling algorithm, SCFQ (S. Jamaloddin Golestani, "A Self-Clocked Fair Queueing Scheme for Broadband Applications", Proc. of Infocom 94, pp. 636–646, 1994) can be mentioned. In the SCFQ, the evaluation value based on the bandwidth allocated to the flow is calculated for each flow and packets of the flow that has the minimum value for this evaluation value will be transmitted. As such, the SCFQ requires the processing for each flow, so that there is a problem that its realization is difficult when a large number of flows are involved. This problem of a large processing load in the case of a large number of flows is also similarly present in the other scheduling algorithms.

Also, the policing function which monitors an amount of arriving packets requires the processing for each flow so that there is a problem of a large processing load in the case of a large number of flows.

Also, when the bandwidth request is made using the RSVP, for example, control packets of the RSVP will be periodically transmitted and received for each flow, so that there is also a problem that a load for processing these control packets becomes large in the case of a large number of flows.

As described, in the scheme in which each node in the network makes a judgement as to whether or not to accept the bandwidth reservation request and carries out the scheduling or policing for each flow from which the bandwidth reservation request has been accepted, there is an advantage in that it is possible to guarantee the communication quality with respect to a flow from which the bandwidth reservation request has been accepted, but there is also a drawback in that the processing load of each node becomes large.

On the other hand, there is also a proposition of a scheme in which an edge node provided at an ingress side of the network writes a tag indicating the priority class in a packet based on the bandwidth allocated to the flow of that packet, and each node inside the network carries out the priority control or scheduling according to the tag written in the packet, instead of carrying out the policing or scheduling that requires the processing for each flow at each node of the network as described above.

Each node inside the network does not have the problem of large processing power required to handle a large number of flows because packet priority control or packet scheduling is done not for each flow but for each priority class.

For instance, in the IETF, the scheme called "Differential Service (D. Clark and J. Wroclawski, "An Approach to Service Allocation in the Internet", Internet Draft draft-clark-diff-svc-alloc-00.txt) and the scheme called "SIMA" (K. Kilkki "Simple Integrated Media Access (SIMA)", Internet Draft draft-kalevi-simple-media-access-01.txt) have been proposed. These are schemes in which a tag indicating a high priority level is written into a packet at a rate proportional to the bandwidth allocated to the flow.

For example, in the case of allocating a bandwidth of 100 [Kbps] to a flow A, the edge node provided at the ingress side of the network monitors the flow A, and writes a value indicating a high priority level in packets up to 100 [Kbps]. At a node inside the network, when congestion occurs, packets with a lower priority level is much more likely to be discarded than packet with higher priority level. In this way, the packets belonging to the flow A will be transferred at a high priority level within the range of 100 [Kbps].

Thus the flow can receive the transfer service at the high priority level as much as the bandwidth that are allocated to it. In this scheme, it suffices for the node inside the network to deal with the priority level written in the packets without becoming conscious of the flow so that there is an advantage that it is sufficient to carry out a simple processing.

FIG. 1 shows an exemplary realization of the differential service. In FIG. 1, a flow A and a flow B are transferred through a network 301. This network 301 comprises core nodes 101–103 and edge nodes 201–204, which are connected through communication links. The core nodes 101–103 carry out the priority processing at a time of packet transfer according to priority tags written in packets. The edge nodes 201–204 are located outside the core nodes 101–103 and write tags indicating the priority levels with respect to packets of the respective flows.

Within the network 301, the flow A is transferred through a route of the edge node 204, the core node 103, the core node 102, and the edge node 202, while the flow B is transferred through a route of the edge node 201, the core node 101, the core node 102, and the edge node 202. The edge node 204 writes a tag indicating the high priority level into packets up to 100 [Kbps] among the packets belonging to the flow A, while the edge node 201 writes a tag indicating the high priority level into packets up to 200 [kbps] among the packets belonging to the flow B. At the nodes 101–103 and 201–203 inside the network 301, when it is inevitable to discard some packets, the low priority packets, i.e., those packets in which the high priority tag is not written, will be discarded at a high priority. As a result, in this network 301, the packets belonging to the flow A up to 100 [Kbps] are transferred at the high priority while the packets belonging to the flow B up to 200 [Kbps] are transferred at the high priority.

However, this does not guarantee the communication quality to each flow. For example, when the transfer capability of the core node 102 is 200 [Kbps], the high priority packets of the flow A and the flow B can be discarded, and therefore it is impossible to guarantee the communication quality to each flow such as the packet loss rate ($10^{-4}$ for example). In other words, there are possibilities for being unable to provide a certain level of the communication quality for the flow as there exists a node on a route of the flow which has high load so that it becomes a bottleneck.

Also, in order to guarantee the communication quality in the above example, at most 300 [Kbps] can be consumed at the node 102, but it is difficult to comprehend this necessary bandwidth at the node 102, that is, it is difficult to determine the transfer capability necessary for the own node, so that it is difficult to make up a plan for augmenting the node facilities.

As such, the differential service scheme and the SIMA scheme have been associated with a problem that it is difficult to guarantee the communication quality for a flow and a problem that it is difficult for each node to comprehend the bandwidth to be consumed at the own node.

Note that the case of the IP network described here is only an example, and there are other schemes for reserving bandwidth on the connectionless communication network, and some more such schemes are expected to appear in future.

Thus, when the service such as Guaranteed Service or the Controlled Load Service is utilized in order to guarantee the communication quality in the connectionless communication network, there arises the first problem in that the there is a need to carry out the processing for each flow such as the scheduling or policing processing and the processing of RSVP control packets at each node within the network so that the processing load becomes high when a large number of flows are involved.

On the other hand, in the scheme such as the differential service in which a tag indicating the priority level is to be written in packets at a rate proportional to the bandwidth at an edge node provided at the ingress side of the network and the priority control is to be carried out at a time of the transfer processing according to this priority level at a node inside the network, there arise the second problem in that it is impossible to guarantee the communication quality to each flow, and the third problem that it is difficult to make up a plan for augmenting the node facilities according to the bandwidth consumed at each node.

SUMMARY OF THE INVENTION

It is therefore an object of the present invention to provide a communication resource management method and a node device which are capable of resolving the above noted second and third problems, without requiring the core nodes inside the network to carry out a processing with respect to packets that accounts for their flows, that is, while resolving the above noted first problem.

In the present invention, the attention is paid to the fact that the above noted second problem is caused because it is impossible for each edge node (204 for example) to know that a node (102 for example) on the route of the flow that is to be transmitted from that edge node (204) is currently in a state of having a high load due to high priority packets that flow into the network from another edge node (201 for example) so that high priority packets in excess of the transfer capability of the node on the route will flow into that node. Also, the attention is paid to the fact that the above noted third problem is caused because each node inside the network has no way of knowing the reserved bandwidth of the flow that passes through the own node.

According to one aspect of the present invention there is provided a method for managing communication resources in a network containing edge nodes located at a boundary of the network and core nodes located inside the network, comprising the steps of: (a) storing at one edge node an information for obtaining an available amount of communication resources that can be newly allocated in the network to one set of flows which share at least a route from said one edge node to an egress node of the network; (b) carrying out an admission control at said one edge node by newly receiving a request for allocation of communication resources for one flow belonging to said one set of flows, judging whether or not to accept the request according to a requested amount of communication resources and the available amount of communication resources as obtained from the information stored at the step (a) for said one set of flows, and allocating requested communication resources to said one flow when it is judged that the request is to be accepted; and (c) transmitting packets at said one edge node by describing a priority level in each packet according to an amount of communication resources allocated to a flow of the packets at the step (b), such that a core node carries out a transfer processing with respect to received packets according to the priority level described in each received packet.

In this aspect, the edge node can check whether the remaining resources (resources that can be newly allocated) are sufficient or not before accepting the resource allocation request for some flow, so that it is possible to transfer packets of the flow such that the communication quality of the accepted flow can be satisfied even when arrived packets of that flow uses the requested resources fully, in this network.

In order for the edge node to obtain the remaining resources, the communication resources that can be allocated to each set of flows can be set up in advance such that the prescribed communication quality can be satisfied, or the remaining resources on the route can be notified to the edge node by exchanging messages among nodes on the route from the ingress node to the egress node of the network.

According to another aspect of the present invention there is provided a method for managing communication resources in a network containing edge nodes located at a boundary of the network and core nodes located inside the network, comprising the steps of: (a) carrying out a priority control in which an edge node transmits packets by describing a priority level in each packet according to an amount of communication resources allocated to a flow of the packets, and a core node carries out a transfer processing with respect to received packets according to the priority level described in each received packet; (b) transmitting from one edge node a notification regarding an amount of communication resources allocated to a set of flows which include one flow and which share at least a route from said one edge node to an egress node of the network, according to an amount of communication resources allocated to said one flow; and (c) receiving the notification at one core node and calculating an amount of communication resources to be consumed at said one core node according to the notification.

In this aspect, each node inside the network can manage the resources to be consumed at the own node, so that it becomes easier to conjecture a transfer capability required for the own node according to a change in time of the resources to be consumed, and thereby it becomes easier to make a node capability augmentation plan.

In addition, it is possible to carry out the management of the resources to be consumed for each set of flows, so that it is possible to reduce the processing load compared with the case where only the management for each flow is possible.

Note that, by managing the resources to be consumed at the own node, it becomes possible to obtain the remaining resources from the resources to be consumed and the transfer capability of the own node, and by notifying the remaining resources to the edge node, it becomes possible for the edge node to make a judgement as to whether or not to accept a new resource allocation request.

According to another aspect of the present invention there is provided a method for managing communication resources in a network containing edge nodes located at a boundary of the network and core nodes located inside the network, comprising the steps of: (a) carrying out a priority control in which an edge node transmits packets by describing a priority level in each packet according to an amount of communication resources allocated to a flow of the packets, and a core node carries out a transfer processing with respect to received packets according to the priority level described in each received packet; (b) transmitting from one edge node an allocated resource notification regarding an amount of communication resources allocated to one set of flows which include one flow and which share at least a route from said one edge node to an egress node of the network, according to an amount of communication resources allocated to said one flow; (c) sequentially transmitting a remaining resource notification regarding a remaining amount of communication resources that can be newly allocated to some set of flows at each node, which is obtained according to the allocated resource notification transmitted from said one edge node and a transfer capability of said each node, from the egress node through any intermediate core codes, toward an upstream side of said one set of flows; and (d) obtaining at said one edge node an available amount of communication resources that can be newly allocated in the network to said one set of flows, according to the remaining resource notification received from a neighboring core node on a downstream side of said one set of flows.

In this aspect, each node notifies the remaining resources on the route from the own node up to the egress node, to a neighboring node that is supposed to be on the upstream side of the set of flows, and this is repeated until the notification reaches to the ingress edge node, such that the edge node can ascertain the remaining resources for this set of flows in the network, and make a judgement as to whether or not to accept a new resource allocation request according to the ascertained remaining resources.

According to another aspect of the present invention there is provided a method for managing communication resources in a network containing edge nodes located at a boundary of the network and core nodes located inside the network, comprising the steps of: (a) carrying out a priority control in which an edge node transmits packets by describing a priority level in each packet according to an amount of communication resources allocated to a flow of the packets, and a core node carries out a transfer processing with respect to received packets according to the priority level. described in each received packet; (b) transmitting from one edge node an allocated resource notification regarding an amount of communication resources allocated to one set of flows which include one flow and which share at least a route from said one edge node to an egress node of the network; (c) sequentially transmitting a remaining resource notification regarding a remaining amount of communication resources that can be newly allocated to said one set of flows at each node, which is obtained at said each node according to the amount of communication resources allocated to said one flow by said one edge node or the allocated resource notification transmitted from said one edge node and a transfer capability of said each node, from said one edge node through any intermediate core codes, toward a downstream side of said one set of flows; and (d) notifying from the egress node to said one edge node an available amount of communication resources that can be newly allocated in the network to said one set of flows, which is obtained according to the allocated resource notification transmitted from said one edge node, a transfer capability of the egress node, and the remaining resource notification received from a neighboring core node on an upstream side of said one set of flows.

In this aspect, each node notifies the remaining resources on the route from the ingress node up to the own node, to a neighboring node that is supposed to be on the downstream side of the set of flows, and this is repeated until the notification reaches to the egress node, and then the egress node finally notifies the remaining resources to the ingress edge node, such that the edge node can ascertain the remaining resources for this set of flows in the network, and make a judgement as to whether or not to accept a new resource allocation request according to the ascertained remaining resources.

The present invention also provides an edge node device and a core node device for realizing the above described communication resource management scheme.

Other features and advantages of the present invention will become apparent from the following description taken in conjunction with the accompanying drawings.

BRIEF DESCRIPTION OF THE DRAWINGS

FIG. 5 is a diagram showing a route identification table used in the first embodiment of the present invention.

FIG. 6 is a diagram showing a reserved bandwidth management table used in the first embodiment of the present invention.

FIG. 10 is a diagram showing a reserved bandwidth management table used in the second embodiment of the present invention.

FIG. 17 is a diagram showing a remaining bandwidth management table used in the third embodiment of the present invention.

DETAILED DESCRIPTION OF THE PREFERRED EMBODIMENTS

Now, various embodiments of a communication resource management method and a node device according to the present invention will be described with references to the drawings.

Note that the following description will be directed to the case of IP network, but the present invention is equally applicable to any connectionless packet communication scheme in which a tag indicating the priority level is written in packets at an edge node and the priority control is carried out according to that priority tag at a node inside the network.

Also, in the following description, "flow" indicates a group of packets specified by some information, where the bandwidth reservation request is to be made in units of this group of packets (flow). For example, in the RSVP, the "flow" can be defined as a group of packets which share the same destination address, destination port number, source address, source port number and protocol number, but it is not absolutely necessary to specify the flow by all these information, and it is also possible to specify the flow by any one or a combination of two or more of these information (such as only the destination address or a pair of the destination address and the source address, for example). It is also possible to specify the flow by using the destination network address or the source network address instead of using the destination address or the source address directly.

In addition, "flow group" indicates a set of flows that share a part or a whole of the packet transfer route. For example, in the network in which the flow is defined by a pair of the destination address and the source address and each node determines the packet transfer target according to the destination network address, the "flow group" can be defined as a set of flows which share the same destination network address, for example, or as a set of flows that share the same edge node at the egress side of that network, or else as a set of flows that share the same source network address and destination network address. Here, the definition of the flow group may be different at different nodes. It is assumed however that flows that belongs to one flow group as defined by one node are those (which are Judged by that one node as) sharing the same route at least from that one node up to the edge node at the egress side of that network.

Note also that "bandwidth" used in the following description is only an example of the communication resources.

Note also that "priority control" used in the following description means a control to allocate communication resources for each class, and can be realized by a variety of mechanisms including strict priority queueing, weighted fair queueing, weighted round robin, or class based queueing.

Figure 1:
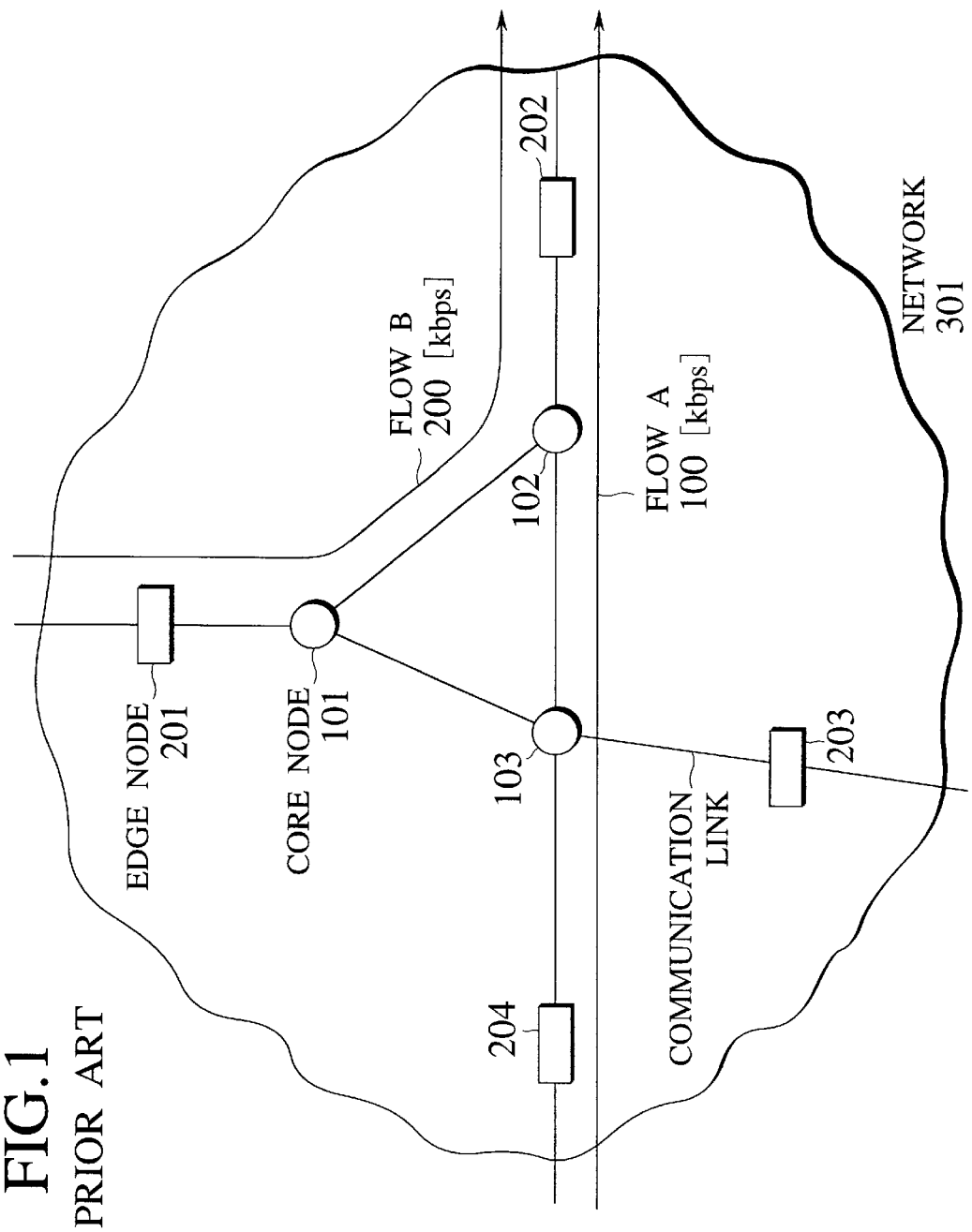
FIG. 1 is a schematic diagram showing a network realizing a conventional differential service.
Figure 2:
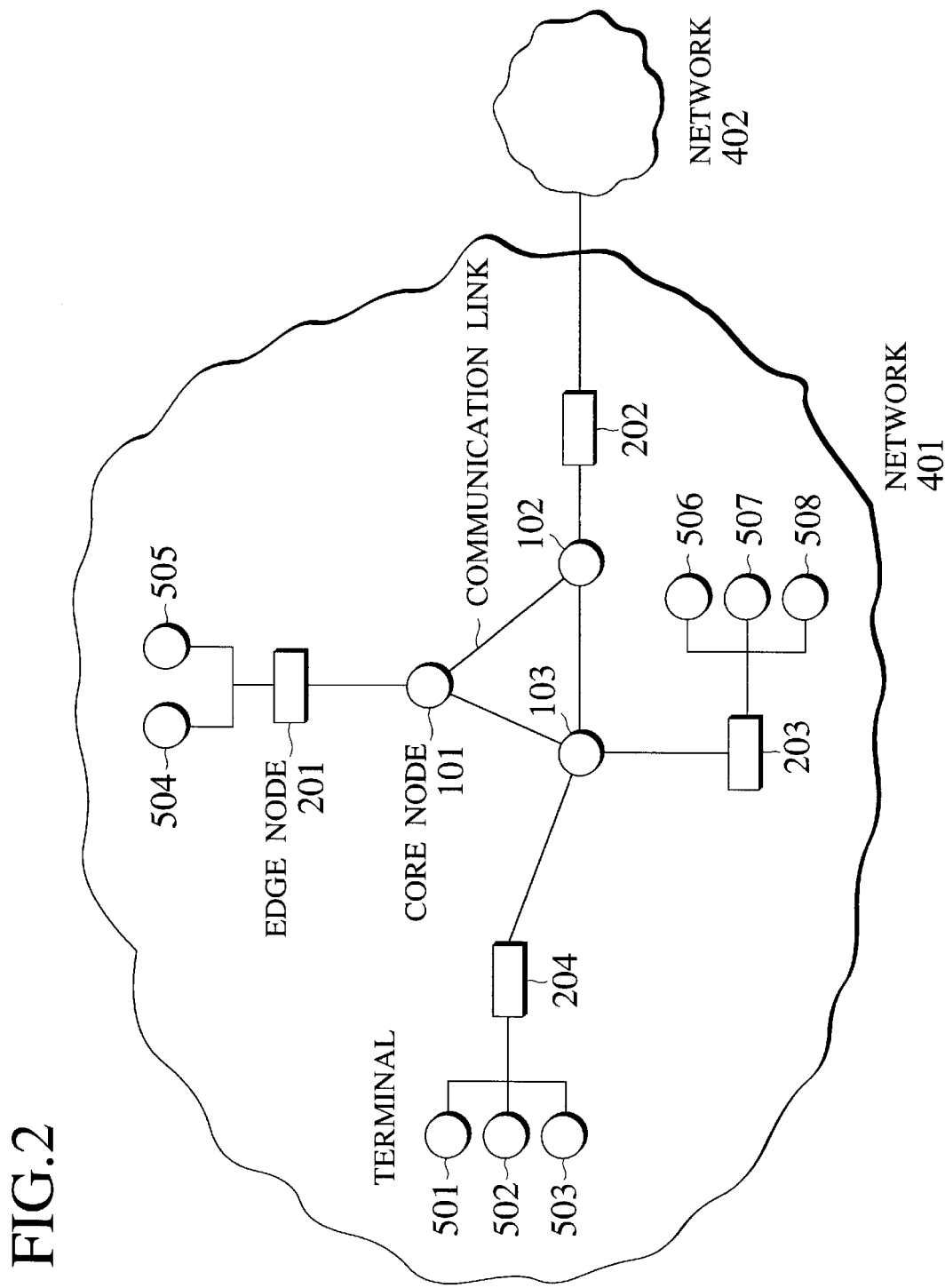
FIG. 2 is a schematic diagram showing an IP network to which the present invention is to be applied.

FIG. 2 shows an exemplary configuration of an IP (Internet Protocol) network to which the present invention is to be applied.

In the IP network shown in FIG. 2, a network 401 formed by a plurality of terminals 501–508, a plurality of routers 101–103, 201–204 and communication links connecting them, is connected with another network 402. Packets transmitted from the terminal will be transferred to the desired destination terminal by the routers.

Figures 3A, 3B:
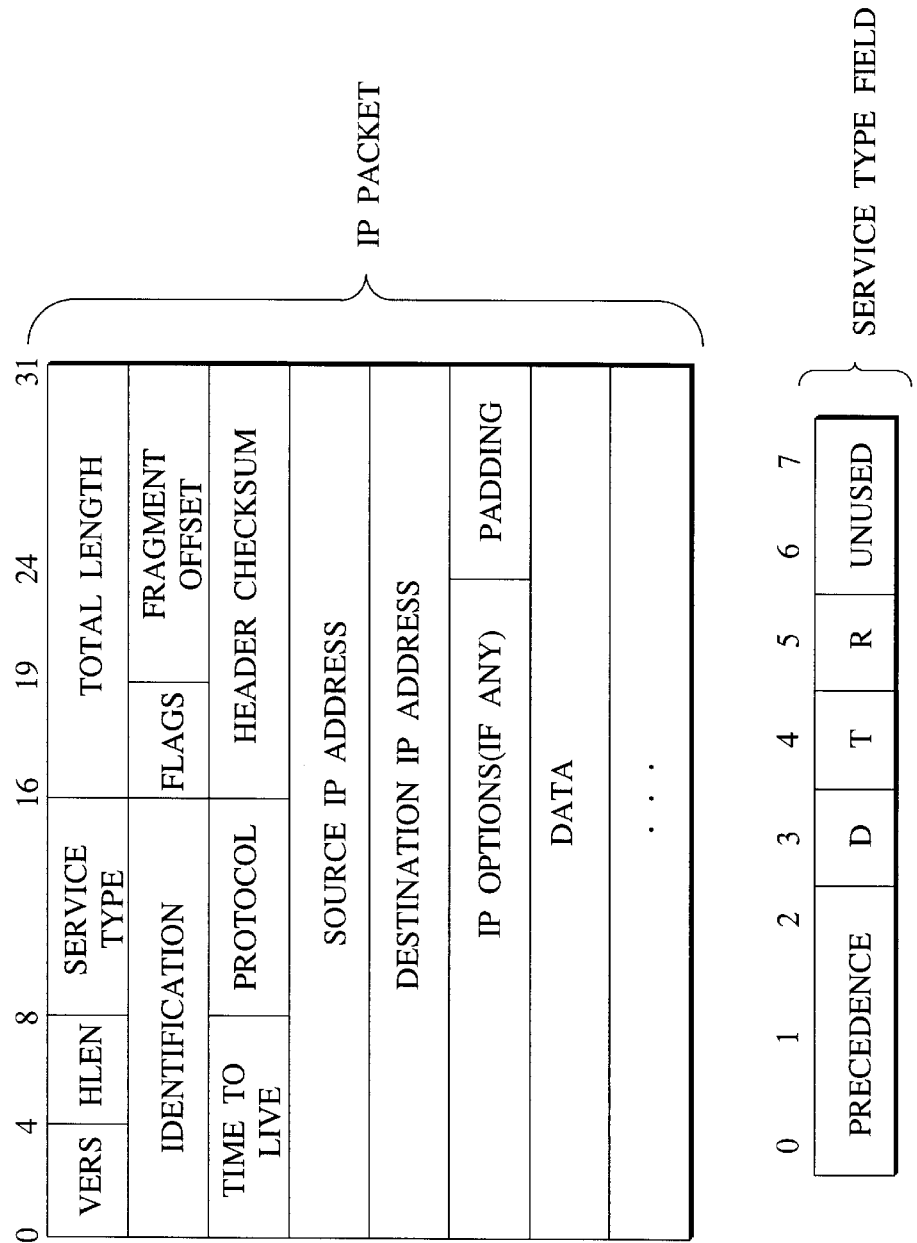
FIG. 3A is a diagram showing an exemplary IP header format used in the present invention.
FIG. 3B is a diagram showing a detail of a Service Type field in the IP header format of FIG. 3A.

In the IP network that provides the differential service, the routers within the network can be classified into core nodes 101–103 and edge nodes 201–204 as shown in FIG. 2. An exemplary operation of the differential service is as follows. For example, when the bandwidth of 100 [Kbps] is to be allocated to the flow transmitted from the terminal 502 to the terminal 504, the edge node 204 attaches tags indicating a high priority level to the packets of the flow to be transmitted from the terminal 502 to the terminal 504 at a rate of 100 [Kbps]. Here attaching a tag implies writing of a value indicating a high priority level into a Precedence subfield provided within a Service Type field of an IP header shown in FIGS. 3A and 3B.

In the case where the IP packet is to be transmitted by being encapsulated in a lower layer packet (such as ATM cell or Ethernet frame, for example), it is also possible to write the information indicating a high priority level into a header of the lower layer packet.

The nodes 204, 103, 101 and 201 on the route carry out the transfer according to the priority level written in the IP packet at a time of carrying out the transfer of the IP packet. The core node may carry out the discarding priority control at a time of the packet transfer or the delay priority control according to the priority level of the packet.

Figure 4:
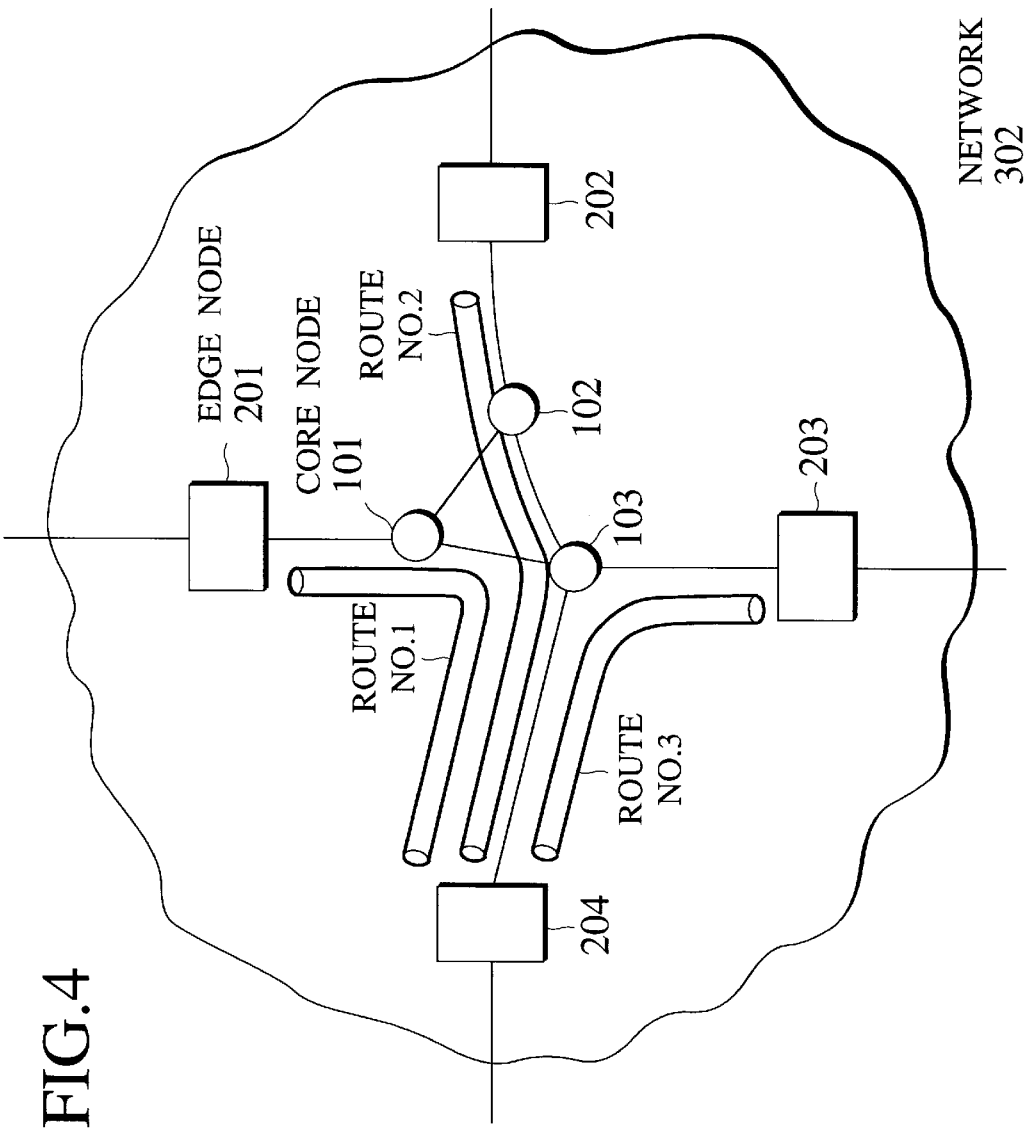
FIG. 4 is a schematic diagram showing an exemplary configuration of a network for realizing a packet transfer procedure according to the first embodiment of the present invention.

Referring now to FIG. 4 to FIG. 6, the first embodiment of a communication resource management method and a node device according to the present invention will be described in detail.

FIG. 4 shows an exemplary case of the packet transfer in a network 302 according to this first embodiment, where the edge node (204 for example) has a setting for a maximum value of an amount up to which the high priority tags can be attached for each route inside the network, and carries out the bandwidth reservation request admission control such that the amount for which the high priority tags are actually attached will not exceed that setting value. This setting value should preferably be set such that the communication quality (e.g., packet loss ratio, delay) for packets to which the high priority tags are attached will be at a certain level even when all the edge nodes attach the high priority tags fully up to the respective setting values, by accounting for the transfer capability of each node inside the network.

Next, the procedure for the bandwidth reservation request admission control will be described. When the edge node receives a bandwidth reservation request for one flow, a route identification table shown in FIG. 5 is looked up according to the destination address of that one flow, and an entry with the coinciding destination network address, that is, an entry for which a bit product of the destination address and the network mask registered in the route identification table coincides with a bit product of the destination address of the flow and the network mask in the route identification table, is searched out. Then, a reserved bandwidth management table shown in FIG. 6 is looked up according to the route identifier of the searched out entry, and a remaining bandwidth of that route is calculated from a route capacity and a used bandwidth of the entry with the coinciding route identifier. If the remaining bandwidth is greater than or equal to the requested bandwidth, the bandwidth reservation request is accepted and the used bandwidth in the corresponding entry of the reserved bandwidth management table of FIG. 6 is updated. If the remaining bandwidth is less than the requested bandwidth, the bandwidth reservation request is not accepted.

Here, scalar quantities are used for the route capacity and the used bandwidth as an example, but it is also possible to use vector quantities such as Tspec used in Guaranteed Service.

Now, the operation in a concrete exemplary case where the bandwidth reservation request for 100 [Kbps] with respect to the flow identified by (destination address, destination port number, source address, source port number, protocol number)=(193.20.10.2, 10000, 120.100.10.35, 20000, 6) is made to the edge node 204 in the network 302 of FIG. 4 will be described.

The edge node 204 recognizes that this flow passes through the route No. 2 by looking up the route identification table of FIG. 5, and then recognizes that the bandwidth of 100 [Kbps] can be reserved for the route No. 2 by looking up the reserved bandwidth management table of FIG. 6. Namely, it can be ascertained that there is the remaining bandwidth of 100 [Kbps] on the route from the ingress node 204 to the egress node 202 of the network 302 which is directed to the destination of this flow. Consequently, it is possible to accept this bandwidth reservation request. After accepting this bandwidth reservation request, the used bandwidth for the route No. 2 in the reserved bandwidth management table of FIG. 6 is increased by 100 [Kbps].

In this way, it is possible for the edge node to carry out the bandwidth reservation request admission control upon receiving the bandwidth reservation request by managing the maximum bandwidth and the used bandwidth that can be set for each route, so that it becomes possible to limit the amount of high priority packets that flow into each node inside the network. As a consequence, it becomes possible to provide the communication quality above a certain level with respect to the high priority packets.

A route for each egress edge node as used in the above example can be obtained from the routing information in the case of using the link state type routing protocol such as OSPF (Open Shortest Path First). Besides OSPF, the route for each egress edge node can be obtained from the next hop contained in the routing information in the case of using BGP (Border Gateway Protocol) as well.

In the above example, the actual route and its route identifier is in one-to-one correspondence, but it is also possible to have a plurality of route identifiers assigned to one actual route. For instance, in the case where the edge node cannot ascertain the route inside the network accurately as the distance vector type routing protocol such as RIP (Routing Information Protocol) is used, one route identifier may be assigned to each destination network address for example. In other words, when a plurality of networks exist beyond one egress edge node, a single route from the ingress edge node to this egress edge node may be defined, or a plurality of routes which share the actual route from the ingress edge node to this egress edge node may be defined in correspondence to the respective networks that exist beyond this egress edge node.

Apart from the route for each egress edge node and the route for each destination network mentioned above, it is possible to use various modifications such as that in which a route is defined for each pair of a source network and a destination network, or that in which a route is defined for each pair of a destination network and a requested service quality. Note that in these two cases mentioned here, the route identification table of FIG. 5 should be supplemented with fields for source address and source network mask or a field for requested service quality, and it is to be looked up by using the above mentioned pair as a key instead of using the destination network address as a key.

Note also that the route identifier used in the first embodiment described above can be considered as having a similar significance as a flow group identifier to be used in the other embodiments described below.

Referring now to FIG. 7 to FIG. 14, the second embodiment of a communication resource management method and a node device according to the present invention will be described in detail.

In this second embodiment, each edge node notifies the reserved bandwidth to each node inside the network by using a reserved bandwidth notification packet, such that each node inside the network can ascertain a value of the reserved bandwidth of a flow that passes through the own node, that is, a value of the bandwidth to be consumed at the own node, according to the reserved bandwidth notification packet. In this way, it becomes easier to realize the network management such as making of a node transfer capability augmentation plan.

Figure 7:
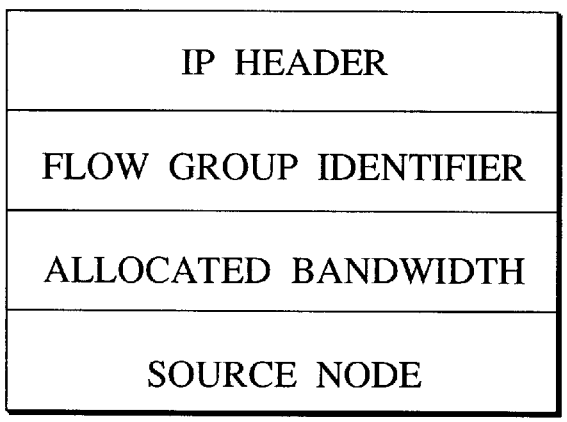
FIG. 7 is a diagram showing an exemplary format of a reserved bandwidth notification packet used in the second embodiment of the present invention.

FIG. 7 shows an exemplary format of the reserved bandwidth notification packet. Here, the reserved bandwidth notification packet is to be transmitted as an IP packet, and comprises an IP header, a flow group identifier field, an allocated bandwidth field, and a source node field.

The flow group identifier can be given by a set of the source address, the destination address and the assigned quality of service in the case of the multicast communication, or by the destination address and the assigned quality of service in the case of the unicast communication, for example. Here, it is also possible to use the destination network address or the source network address instead of the destination address or the source address. In other words, the flow group identifier is to be given by a value that defines "flow", or a value that defines "flow group" which share a part or a whole of the route.

The allocated bandwidth field registers a value of the bandwidth allocated to "flow or flow group" (which will be referred to simply as "flow group" in the following) indicated by the flow group identifier by the edge node.

The source node field registers an address of a node that transmitted this reserved bandwidth notification packet.

Figure 8:
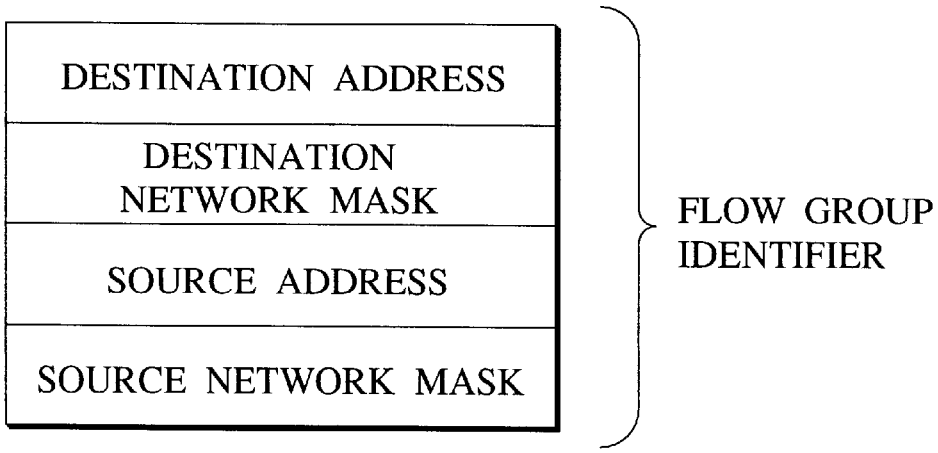
FIG. 8 is a diagram showing an exemplary form of a flow group identifier used in the second embodiment of the present invention.

FIG. 8 shows an exemplary form of the flow group identifier, which comprises a destination address, a destination network mask, a source address and a source network mask. If multiple quality classes are supported, then a field for showing a quality class should be added in the flow group identifier.

Figure 9:
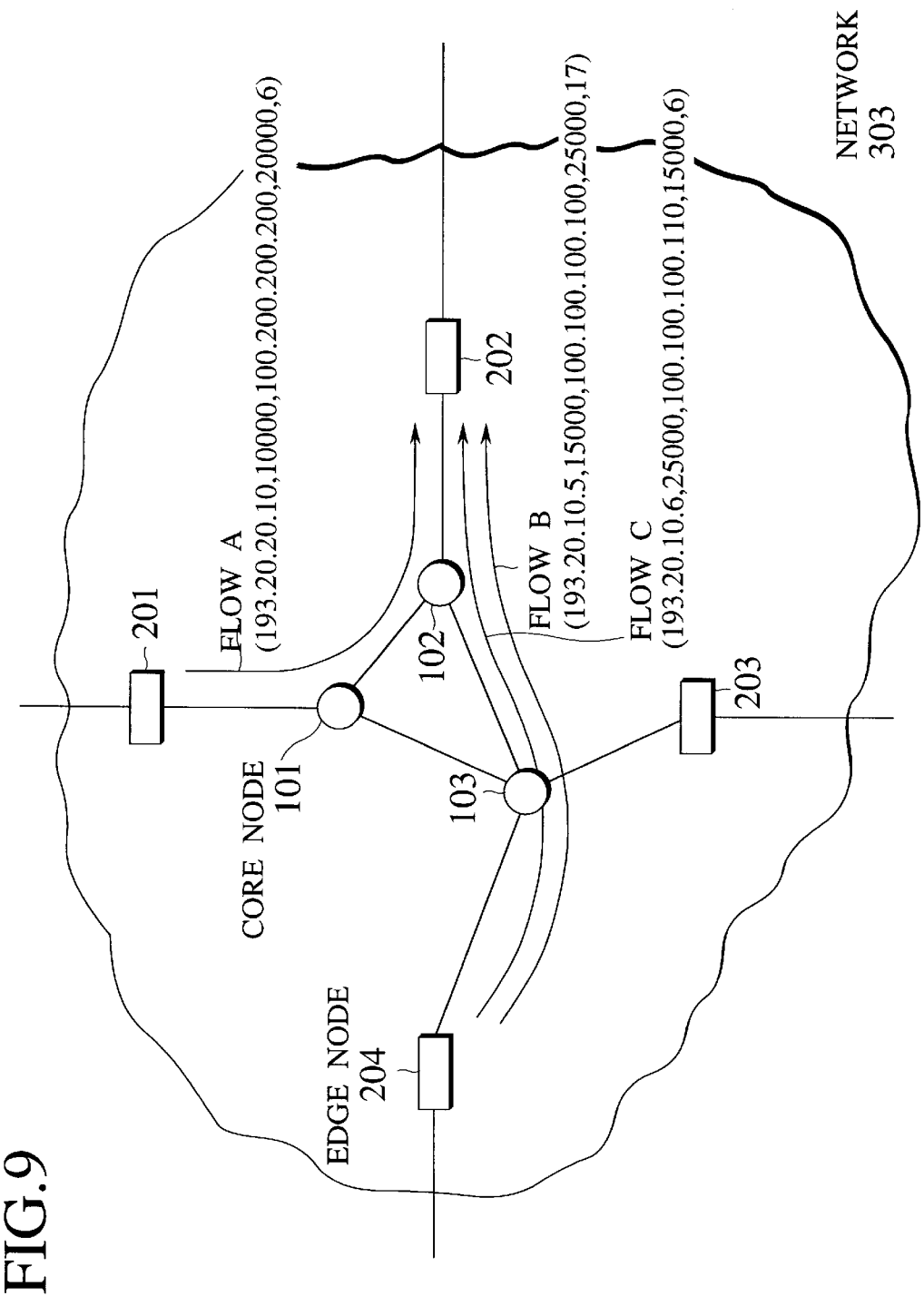
FIG. 9 is a schematic diagram showing an exemplary configuration of a network for realizing a packet transfer procedure according to the second embodiment of the present invention.

Now, suppose that three flows A, B and C are being transferred in a network 303 shown in FIG. 9, and assume that (destination address, destination port number, source address, source port number, protocol number) of the flows A, B and C are given by (193.20.20.10, 10000, 100.200.200.200, 20000, 6), (193.20.10.5, 15000, 100.100.100.100, 25000, 17) and (193.20.10.6, 25000, 100.100.100.110, 15000, 6), respectively, and the bandwidths of 300 [Kbps], 500 [Kbps] and 400 [Kbps] are reserved for the flows A, B and C, respectively.

When it is known that two flows of the flow B and the flow C pass through the same route inside the network 303, i.e., between the edge nodes 204 and 202, the contents of two reserved bandwidth notification packets can be merged, and also the IP packet of the unicast will be routed regardless of the source address, so that the edge node 204 transmits the reserved bandwidth notification packet with the flow group identifier of (193.20.10.0, 255.255.255.0, 0.0.0.0, 0.0.0.0) and the allocated bandwidth of 900 [Kbps] in this case.

Alternatively, the edge node 204 may transmit separate reserved bandwidth notification packets for the flow B and the flow C, that is, the reserved bandwidth notification packet with the flow group identifier (flow destination address, flow destination address mask, flow source address, flow source address mask) of (193.20.10.5, 255.255.255.255, 100.100.100.100, 255.255.255.255) and the allocated bandwidth of 500 [Kbps] and the reserved bandwidth notification packet with the flow group identifier of (193.20.10.6, 255.255.255.255, 100.100.100.110, 255.255.255.255) and the allocated bandwidth of 400 [Kbps], in correspondences to these two flows respectively.

In FIG. 9, the edge node 204 transmits the reserved bandwidth notification packet with the flow group identifier of (193.20.10.0, 255.255.255.0, 0.0.0.0, 0.0.0.0) and the allocated bandwidth of 900 [Kbps] to a next hop node corresponding to this flow group identifier which is the core node 103.

The core node 103 further transfers this reserved bandwidth notification packet to a next hop node which is the core node 102. The core node 102 further transfers this reserved bandwidth notification packet to a next hop node which is the edge node 202. The edge node 202 has no need to further transfer this reserved bandwidth notification packet.

Here, in FIG. 9, the core node 102 also receives the reserved bandwidth notification packet with the flow group identifier of (193.20.20.10, 255.255.255.255, 100.200.200.200, 255.255.255.255) and the allocated bandwidth of 300 [Kbps] from the edge node 201 via the core node 101. At this point, the source node fields of these reserved bandwidth notification packets register addresses of the core nodes 101 and 103 respectively so that it can be recognized that these two reserved bandwidth notification packets originally have different source edge nodes.

Then, when it can be recognized that the flow A from the core node 101 and the flows B, C from the core node 103 take the same route within the network 303 beyond the own node, that is, when it can be recognized that the route from the core node 102 to the edge node 202 is the same, the core node 102 should preferably merge these flow information, and transmit the reserved bandwidth notification packet with the flow group identifier of (193.20.0.0, 255.255.0.0, 0.0.0.0, 0.0.0.0) and the allocated bandwidth of 1200 [Kbps] to the next hop node.

Next, the processing procedure for each node in the case of receiving the reserved bandwidth notification packet will be described. Each node has a reserved bandwidth management table storing the content of the received reserved bandwidth notification packet. FIG. 10 shows an exemplary configuration of this reserved bandwidth management table, which at least has fields for registering the flow group identifier, the allocated bandwidth, and the source node. Besides these, it may also has a field for a route identifier, or fields for an output link number and a route identifier, in order for to identify the route to be taken by each flow group within the network beyond the own node. For example, in the reserved bandwidth management table of the core node 102 of FIG. 9, the entry corresponding to the flow A and the entry corresponding to the flows B, C will have the same value registered in the route identifier field.

Then, when the reserved bandwidth notification packet is received, each node carries out the following processing. First, the reserved bandwidth management table is searched through and an entry having the same flow group identifier and source node as the received reserved bandwidth notification packet is searched out. If no such entry exists, the content of the received reserved bandwidth notification packet is registered in the reserved bandwidth management table. If such an entry exists, the allocated bandwidth of the entry is compared with that of the received reserved bandwidth notification packet, and if they differ, the value of the allocated bandwidth in the reserved bandwidth management table is updates to the value in the received reserved bandwidth notification packet.

It is preferable to delete each entry of this reserved bandwidth management table when no reserved bandwidth notification packet with the same flow group identifier and source node address arrives during a prescribed period of time.

Next, the processing procedure of each node in the case of transmitting the reserved bandwidth notification packet will be described.

First, when the reserved bandwidth management table has the route identifier field, an entry of the reserved bandwidth management table which has a given value of the route identifier is searched out. Then, the reserved bandwidth notification packet is transmitted toward the next hop node according to the content of each entry that is searched out. At this point, when there are a plurality of searched out entries and their plurality of flow group identifiers can be merged into a single flow group identifier, it is preferable to transmit a single reserved bandwidth notification packet by summing up the allocated bandwidths. For example, when there exist an entry with the flow group identifier of (193.20.10.0, 255.255.255.0, 0.0.0.0, 0.0.0.0) and an entry with the flow group identifier of (193.20.20.10, 255.255.255.255, 0.0.0.0, 0.0.0.0), and the routing table indicates that 193.20.0.0 as the network address of these, these two flow group identifiers can be merged into (193.20.0.0 255.255.0.0, 0.0.0.0, 0.0.0.0). When they cannot be merged into one, the reserved bandwidth notification packets corresponding to these entries are separately transmitted.

By carrying out the above operation for each route identifier, the transmission of the reserved bandwidth notification packet is carried out.

When the reserved bandwidth management table has no route identifier field, it suffices to transmit the reserved bandwidth notification packet toward the next hop node according to the content of the corresponding entry for each flow group identifier.

Note that the transmission of the reserved bandwidth notification packet as described above should preferably be repeated periodically.

Note also that the reserved bandwidth notification packet is transmitted to the next hop node of the flow group to which the bandwidth is to be notified in the above described example, but it may also be possible to transmit the reserved bandwidth notification packet toward one of the destination addresses of the flows contained in the flow group identifier that is carried out by the reserved bandwidth notification packet. In such a case, a node that transmits the reserved bandwidth notification packet transmits it by writing a value indicating that it is the reserved bandwidth notification packet in the Protocol field of the IP header of the reserved bandwidth notification packet. Then, at a time of transferring the received packet, each node inside the network inspects the Protocol field of the IP header of the received packet and if it indicates that it is the reserved bandwidth notification packet, each node inside the network carries out the reception processing and the transmission processing of the reserved bandwidth notification packet as described above instead of carrying out the usual packet transfer. At this point, the destination of the reserved bandwidth notification packet to be transmitted will be one of the destination addresses of the flows indicated by the flow group identifier rather than the next hop node.

Figure 11:
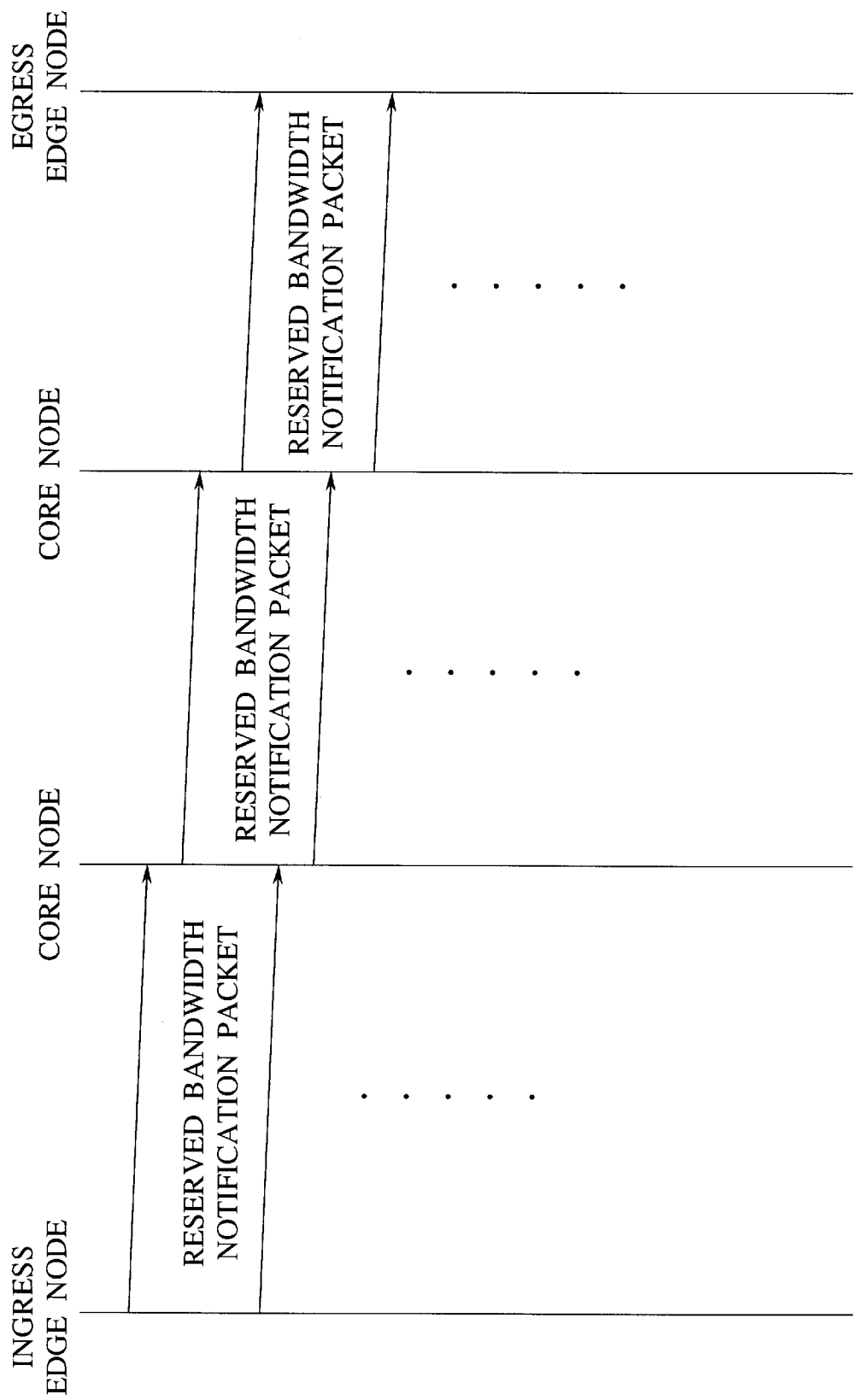
FIG. 11 is a sequence chart for an exemplary message sequence according to the second embodiment of the present invention.

FIG. 11 shows an exemplary message sequence in this second embodiment. The ingress edge node transmits the reserved bandwidth notification packet toward the downstream side core node. Then, the core node that received this packets registers the flow group identifier and its allocated bandwidth indicated in this packet, and transfers this packet to the further downstream side. This transmission of the reserved bandwidth notification packet is repeated periodically.

Note that FIG. 11 depicts as if the transmission of the reserved bandwidth notification packet takes place upon receiving the reserved bandwidth notification packet from the previous hop node, but it is possible for each node inside the network to transmit the reserved bandwidth notification packet periodically at independent timing.

As values to be written into the reserved bandwidth notification packet to be transmitted, values of the flow group identifier and its allocated bandwidth as received from the previous hop node can be used in the case of utilizing the timing of reception from the previous hop node, or values of the flow group identifier and its allocated bandwidth as stored at each node can be used in the case of transmitting it at independent timing of each node.

Figure 12:
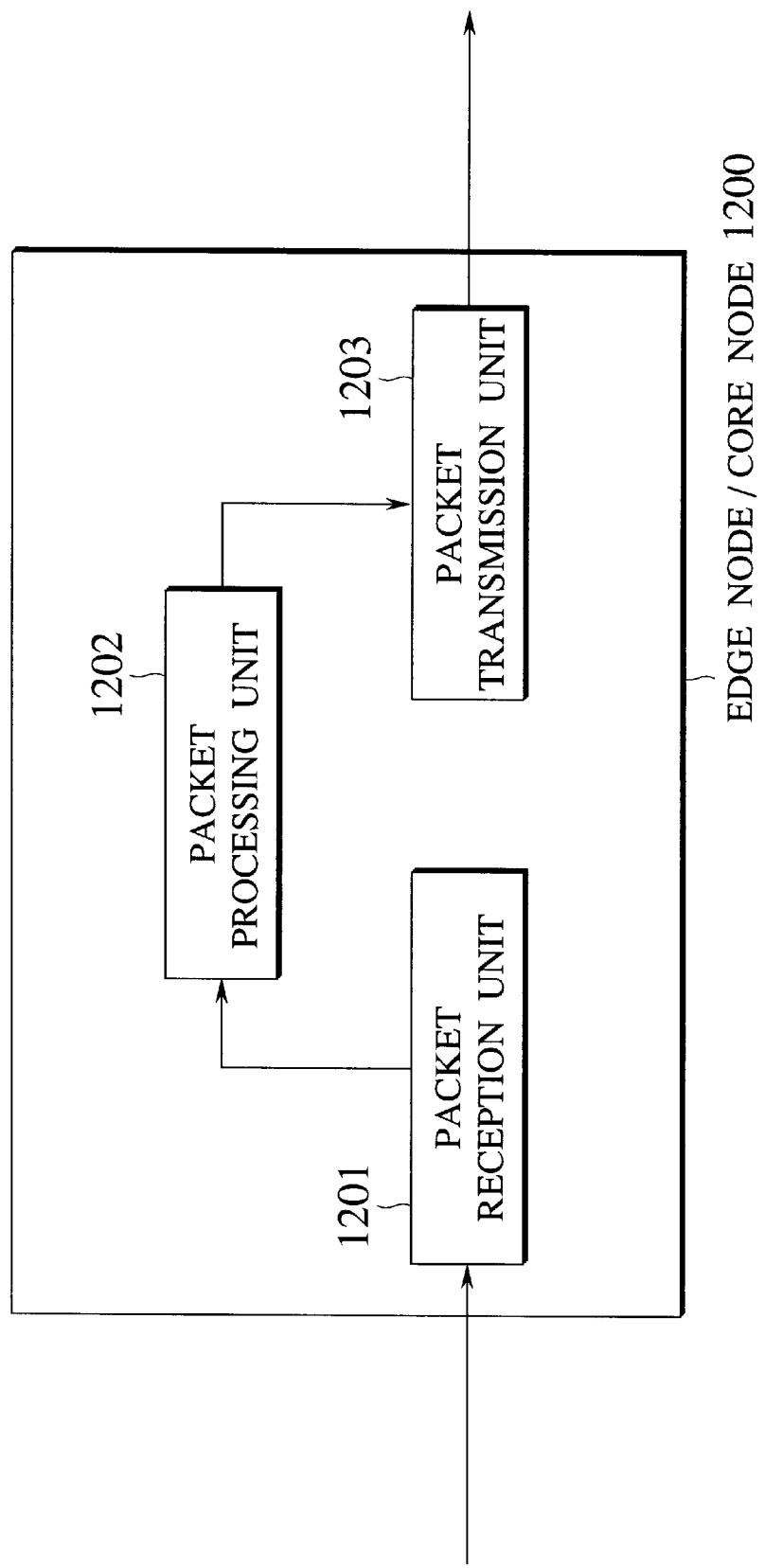
FIG. 12 is a block diagram showing an exemplary configuration of a node device for an edge node or a core node according to the present invention.

Now, FIG. 12 shows an exemplary configuration of an edge node or a core node in this second embodiment. As shown in FIG. 12, each edge node/core node 1200 comprises a packet reception unit 1201, a packet processing unit 1202 and a packet transmission unit 1203.

Figure 13:
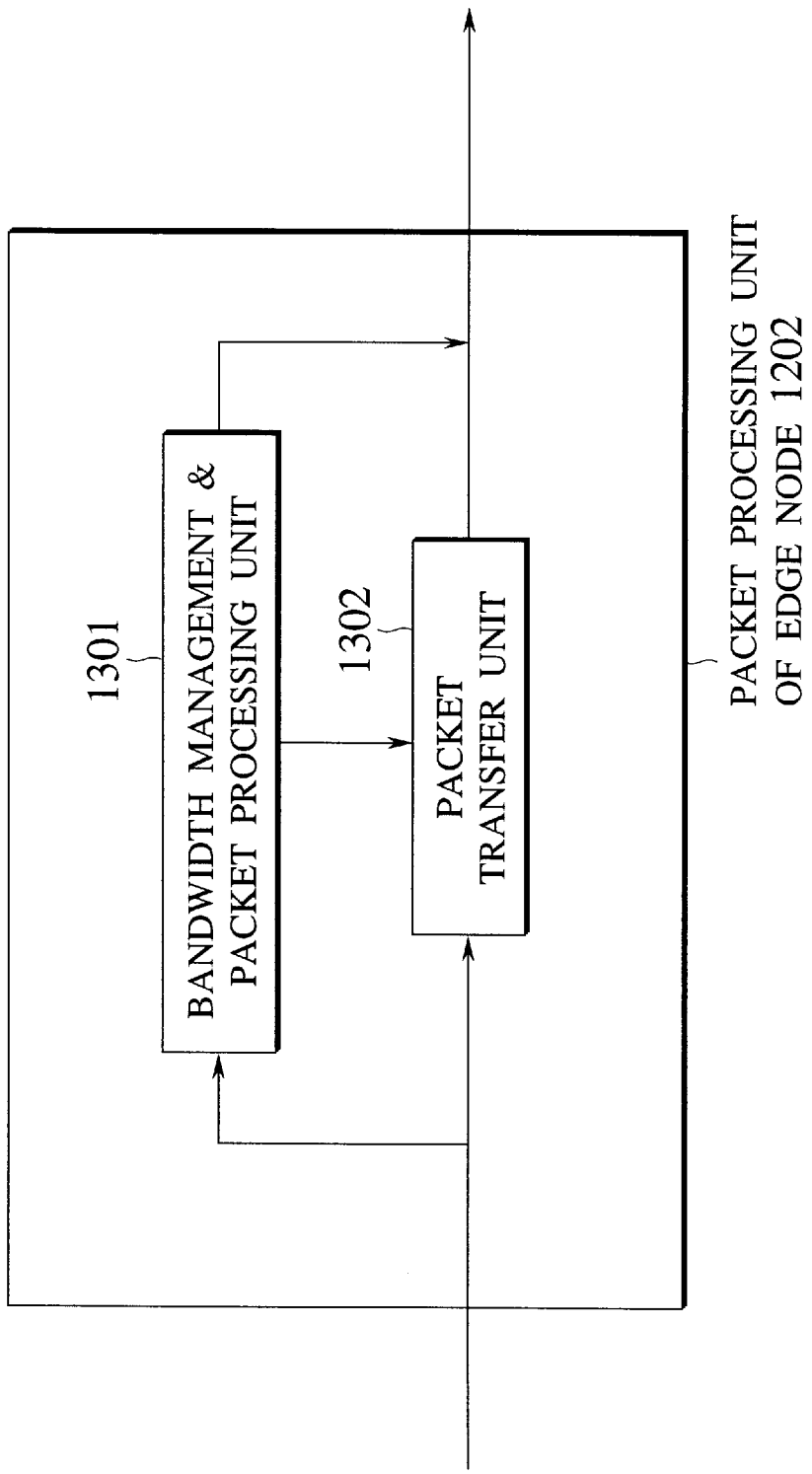
FIG. 13 is a block diagram showing an exemplary configuration of a packet processing unit in the node device of FIG. 12 for an edge node.

FIG. 13 shows an exemplary configuration of the packet processing unit 1202 for the edge node. This packet processing unit 1202 comprises a bandwidth management and packet processing unit 1301 and a packet transfer unit 1302.

The bandwidth management and packet processing unit 1301 of the edge node stores the reserved bandwidth of each flow using the reserved bandwidth management table as described above, for example, and carries out the operation to produce the reserved bandwidth notification packet and gives it to the packet transmission unit 1203 and the operation to notify the reserved bandwidth of the flow to the packet transfer unit 1302.

The packet transfer unit 1302 of the (ingress) edge node writes a value indicating the priority level at a rate according to the reserved bandwidth notified from the bandwidth management and packet processing unit 1301 into the IP header portion of data packets at a time of sending a series of data packets arrived at the packet reception unit 1201 to the packet transmission unit 1203.

The packet transmission unit 1203 carries out an appropriate transmission processing with respect to the data packet given from the packet transfer unit 1302 or the reserved bandwidth notification packet given from the bandwidth management and packet processing unit 1301, and transmits it to a desired output link.

Figure 14:
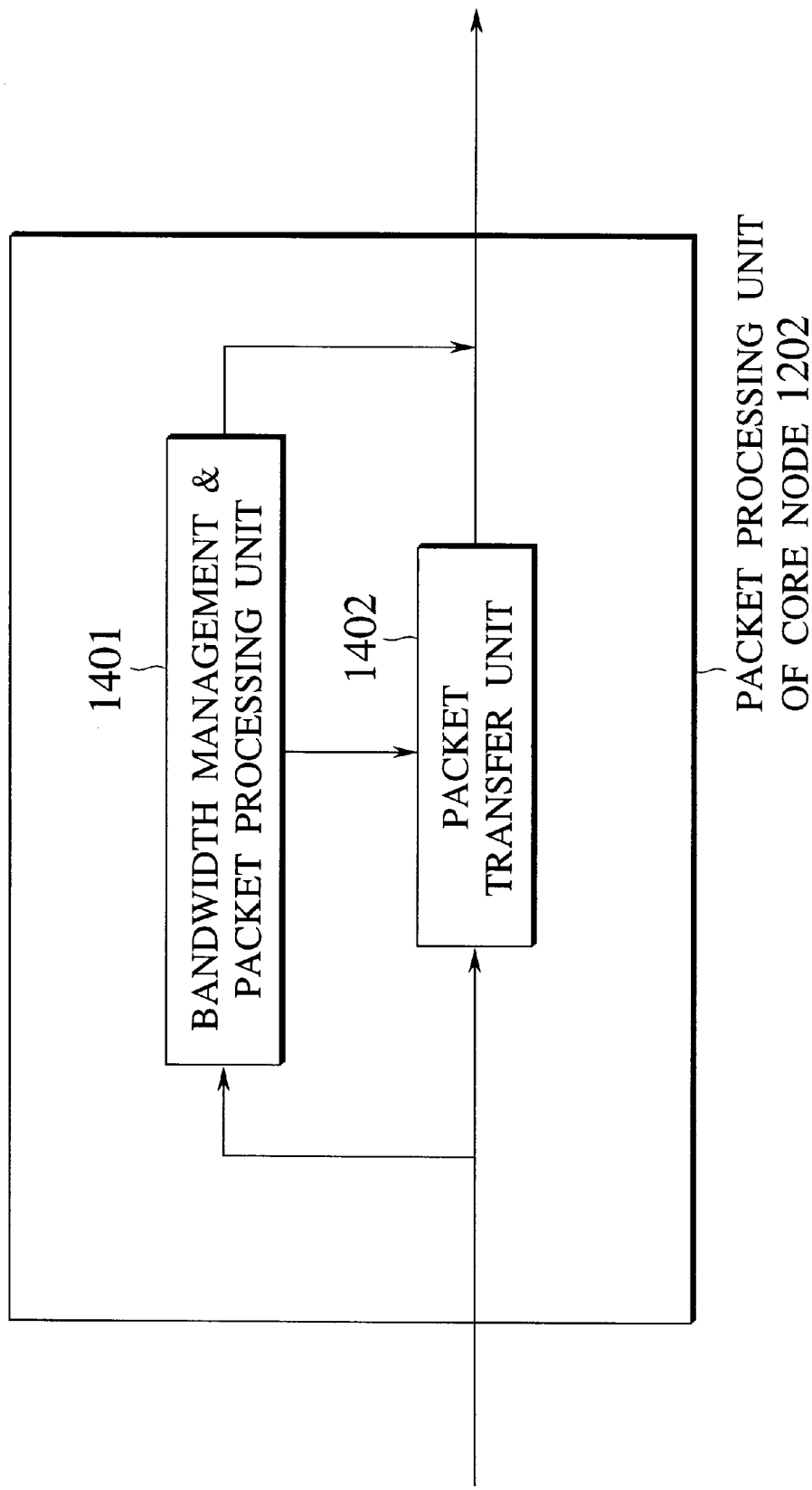
FIG. 14 is a block diagram showing an exemplary configuration of a packet processing unit in the node device of FIG. 12 for a core node.

FIG. 14 shows an exemplary configuration of the packet processing unit 1202 for the core node. This packet processing unit 1202 comprises a bandwidth management and packet processing unit 1401 and a packet transfer unit 1402.

When the reserved bandwidth notification packet arrives at the core node, the packet reception unit 1201 gives it to the bandwidth management and packet processing unit 1401. The bandwidth management and packet processing unit 1401 then stores the flow group identifier and its allocated bandwidth as described in this packet into the reserved bandwidth management table as described above. Then, when the stored value differs from the value in the previously received reserved bandwidth notification packet, the bandwidth management and packet processing unit 1401 of the core node gives the reserved bandwidth notification packet that accounts for the change of the value in the received reserved bandwidth notification packet immediately to the packet transmission unit 1203, and when a prescribed period of time has elapsed since the reserved bandwidth notification packet is transmitted last time, the bandwidth management and packet processing unit 1401 of the core node gives the reserved bandwidth notification packet produced by referring to the flow group identifier and its allocated bandwidth stored therein, to the packet transmission unit 1203.

The packet transfer unit 1402 of the core node sends the data packet arrived at the packet reception unit 1201 to the packet transmission unit 1203 while carrying out the priority control according to the priority level written in that data packet.

The packet transmission unit 1203 carries out an appropriate transmission processing with respect to the data packet given from the packet transfer unit 1402 or the reserved bandwidth notification packet given from the bandwidth management and packet processing unit 1401, and transmits it to a desired output link.

As described, by maintaining the reserved bandwidth management table at each node inside the network, it becomes possible to ascertain the amount of bandwidth to be consumed at each node. By monitoring a change in this bandwidth to be consumed, it is possible to conjecture the amount of bandwidth to be consumed in future. When this conjectured value exceeds the node capability, it is possible to switch the node to that with a higher capability so as to maintain the network that can provide the stable communication quality. In this way, it is possible to ascertain the amount of bandwidth to be consumed, and it becomes easier to make the facility augmentation plan.

It is also possible to measure the consumed bandwidth by monitoring the actual amount of transferred packets at each node, but the terminal does not necessarily always transmits the high priority packets by using the reserved amount of bandwidth, so that the problem of not being able to maintain the communication quality may arises when the bandwidth to be consumed is underestimated and many terminals transmit packets at the values of the reserved bandwidth. In contrast, according to this second embodiment, it is possible to ascertain the amount of bandwidth that is reserved, so that such a problem does not arise.

Referring now to FIG. 15 to FIG. 18, the third embodiment of a communication resource management method and a node device according to the present invention will be described in detail.

In this third embodiment, the node inside the network notifies the edge node about the remaining bandwidth calculated from the reserved bandwidth management table as described in the second embodiment and the communication resources of the own node, such that upon receiving a new bandwidth reservation request the edge node can carry out the admission control (for admitting the request in the case where a certain communication quality can be provided inside the network) with respect to the received bandwidth reservation request. Note in particular that this has been realized in the first embodiment by statically setting the maximum value of the bandwidth that can be reserved for each route, whereas this third embodiment enables the edge node to carry out the admission control dynamically according to the bandwidth that is actually remaining (not reserved for any flow) at the node on the route at each moment.

The edge node obtains the remaining bandwidth for each flow group from the reserved bandwidth management table and the communication resources of the own node, and transmits a remaining bandwidth notification packet describing this remaining bandwidth to neighboring nodes. The node that received this remaining bandwidth notification packet carries out the processing of the remaining bandwidth notification packet only when the received link is an output link of packets belonging to the flow group to which the remaining bandwidth is related. In the processing of the receiving remaining bandwidth notification packet, the remaining bandwidth of the own node and the remaining bandwidth described in the remaining bandwidth notification packet are compared, and a remaining bandwidth notification packet with the smaller one of them written therein is transmitted to neighboring nodes of all the links other than the received link. By repeating this operation, the remaining bandwidth on the route of the flow group will be notified to the edge node corresponding to the ingress side. In this way, upon receiving a new bandwidth reservation request for some flow, it becomes possible for the ingress edge node to make a judgement as to whether or not to accept this request according to the bandwidth that is remaining on the route inside the network through which that flow should pass.

Figure 15:
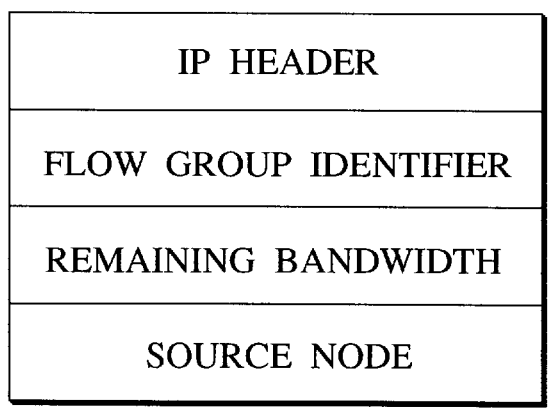
FIG. 15 is a diagram showing an exemplary format of a remaining bandwidth notification packet used in the third embodiment of the present invention.

FIG. 15 shows an exemplary format of the remaining bandwidth notification packet. Here, the remaining bandwidth notification packet is to be transmitted as an IP packet, and comprises an IP header, a flow group identifier field, a remaining bandwidth field, and a source node field.

The flow group identifier is the same as the flow group identifier in the reserved bandwidth notification packet described above. The remaining bandwidth field registers a value of the bandwidth that can be reserved now (that is still remaining) on the route from a node that transmitted this remaining bandwidth notification packet up to the egress edge node of that network, for the flow group indicated by the flow group identifier.

The source node field registers an address of a node that transmitted this remaining bandwidth notification packet.

Figure 16:
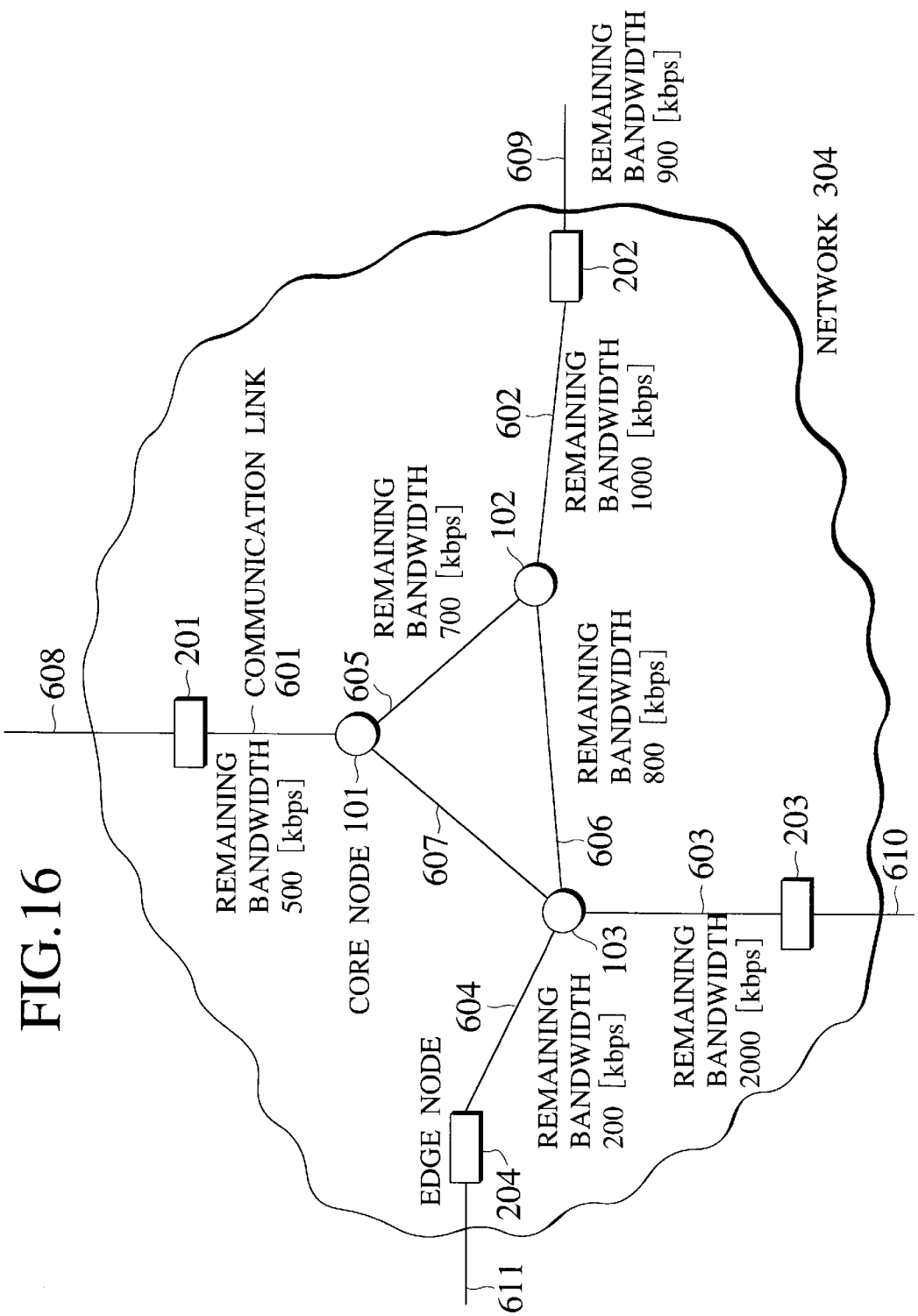
FIG. 16 is a schematic diagram showing an exemplary configuration of a network for realizing a packet transfer procedure according to the third embodiment of the present invention.

Now, a concrete example of the procedure as described above will be described for an exemplary case of a network 304 shown in FIG. 16. The network 304 comprises edge nodes 201–204, core nodes 101–103, and communication links 601–611 for interconnecting nodes. The edge node writes the priority level into a packet flowing into the network 304 according to its reserved bandwidth, and the core node carries out the priority control at a time of packet transfer according to that priority level. Of course, it is also possible for the edge node to carry out the priority control at a time of packet transfer according to the priority level written by the own node.

Each of the nodes 101–103 and 201–204 inside the network 304 has the reserved bandwidth management table shown in FIG. 10 and a remaining bandwidth management table shown in FIG. 17. In the reserved bandwidth management table, entries are maintained and updated upon receiving the reserved bandwidth notification packet. The remaining bandwidth management table stores the link capacity and the used bandwidth for each output link such that the remaining bandwidth can be obtained from these. For example, when the core node 102 has the reserved bandwidth management table of FIG. 10, by searching out entries with the output link number equal to 1 and calculating a sum of their allocated bandwidths, it is possible to obtain the used bandwidth of the output link No. 1 in FIG. 17 is 1200 [Kbps]. Then, by setting the link capacity of each output link in advance and taking a difference between the link capacity and the used bandwidth, it is possible to obtain the remaining bandwidth of the output link No. 1 as 1000 [Kbps].

Now, suppose that a packet with the destination network address 193.20.0.0 that arrived at the edge node 201 will be transferred by the route of the core node 101, the core node 102 and the edge node 202, a packet with the destination network address 193.20.0.0 that arrived at the edge node 203 will be transferred by the route of the core node 103, the core node 102 and the edge node 202, and a packet with the destination network address 193.20.0.0 that arrived at the edge node 204 will be transferred by the route of the core node 103, the core node 102 and the edge node 202. Note also that, in FIG. 16, the remaining bandwidth of the node is indicated for each output link. Namely, a value of the remaining bandwidth described along the communication link actually indicates the remaining bandwidth of the node on the upstream side of that communication link.

In this case, the edge node 202 transmits the remaining bandwidth notification packet in which (193.20.0.0, 255.255.0.0, 0.0.0.0, 0.0.0.0) is described as (destination address, destination network mask, source address, source network mask) in the flow group identifier field and the remaining bandwidth 900 [Kbps] of the output link 609 of this flow group is described in the remaining bandwidth field, to the neighboring node (core node 102) of the communication link 602 other than the output link of this flow group.

Upon receiving this remaining bandwidth notification packet, the core node 102 compares the remaining bandwidth 1000 [Kbps] of the output link 602 for this flow group at the own node with the remaining bandwidth 900 [Kbps] described in the received remaining bandwidth notification packet, and writes the smaller one, i.e., 900 [Kbps], into the remaining bandwidth field of the remaining bandwidth notification packet to be transmitted by the own node, while writing (193.20.0.0, 255.255.0.0, 0.0.0.0, 0.0.0.0) as (destination address, destination network mask, source address, source network mask) in the flow group identifier field. Then, this remaining bandwidth notification packet is transmitted to the neighboring nodes (core nodes 101 and 103) of the communication links 605 and 606 other than the output link of this flow group.

Upon receiving this remaining bandwidth notification packet, the core node 101 compares,the remaining bandwidth 700 [Kbps] of the output link 605 of the flow group indicated by the flow group identifier at the own node with the remaining bandwidth 900 [Kbps] described in the received remaining bandwidth notification packet, and writes the smaller one, i.e., 700 [Kbps], into the remaining bandwidth field of a remaining bandwidth notification packet to be transmitted by the own node, while writing the same flow group identifier as in the received remaining bandwidth notification packet into the flow group identifier field of this remaining bandwidth notification packet to be transmitted, and transmits this remaining bandwidth notification packet to the neighboring nodes (edge node 201 and core node 103) of the communication links 601 and 607 other than the output link of this flow group.

Upon receiving this remaining bandwidth notification packet, the core node 103 discards the received remaining bandwidth notification packet because the output link of the packet with the destination network address 193.20.0.0 indicated by the flow group identifier is not 607 (it is different from the source node 101 of the remaining bandwidth notification packet received by the next hop node 102 corresponding to 193.20.0.0).

On the other hand, the edge node 201 compares the remaining bandwidth 500 [Kbps] of the output link 601 of the flow group indicated by the flow group identifier at the own node with the remaining bandwidth 700 [Kbps] described in the received remaining bandwidth notification packet, and chooses the smaller one such that it is ascertained that the remaining bandwidth of 500 [Kbps] is available on the route inside the network 304 for the flow group indicated by the flow group identifier (193.20.0.0, 255.255.0.0, 0.0.0.0, 0.0.0.0).

By the similar procedure, the edge node 203 ascertains that the remaining bandwidth of 800 [Kbps] is available on the route inside the network 304 for the flow group indicated by the flow group identifier (193.20.0.0, 255.255.0.0, 0.0.0.0, 0.0.0.0), and the edge node 204 ascertains that the remaining capacity of 200 [Kbps] is available.

Each edge node stores the remaining bandwidth so notified along with the corresponding flow group identifier, and overwrites the stored content when a new remaining bandwidth notification packet having the same flow group identifier is received.

In this way, it becomes possible for the edge node 201, for example, to make a judgement as to whether or not to accept the bandwidth reservation request upon newly receiving the bandwidth reservation request for the flow belonging to the flow group indicated by the flow group identifier (193.20.0.0, 255.255.0.0, 0.0.0.0, 0.0.0.0), according to whether the requested bandwidth is smaller than 500 [Kbps] or not, by referring to the above described stored content.

Note that the value of the flow group identifier of the remaining bandwidth notification packet to be transmitted is set to be the same as that of the received remaining bandwidth notification packet in the above example, but it is also possible to use different values. For example, it is possible to transmit the remaining bandwidth notification packet in which the flow group identifier as described in the reserved bandwidth notification packet is written, with respect to the upstream node from which the reserved bandwidth notification packet has been received.

For instance, consider the case where the core node 102 receives the remaining bandwidth notification packet in which (193.20.0.0, 255.255.0.0, 0.0.0.0, 0.0.0.0) is described as (destination address, destination network mask, source address, source network mask) in the flow group identifier field. The core node 102 searches for entries of the flow group contained in the above flow group identifier from the reserved bandwidth management table of FIG. 10, and transmits the remaining bandwidth notification packet with the flow group identifier described as (193.20.10.0, 255.255.255.0, 0.0.0.0, 0.0.0.0) to the core node 103 while transmitting the remaining bandwidth notification packet with the flow group identifier described as (193.20.20.10, 255.255.255.255, 0.0.0.0, 0.0.0.0) to the core node 101.

Note that it is preferable to transmit the above described remaining bandwidth notification packet immediately when the remaining bandwidth is changed. It is also preferable for each node to transmit the remaining bandwidth notification packet periodically even when there is no change in the remaining bandwidth.

Figure 18:
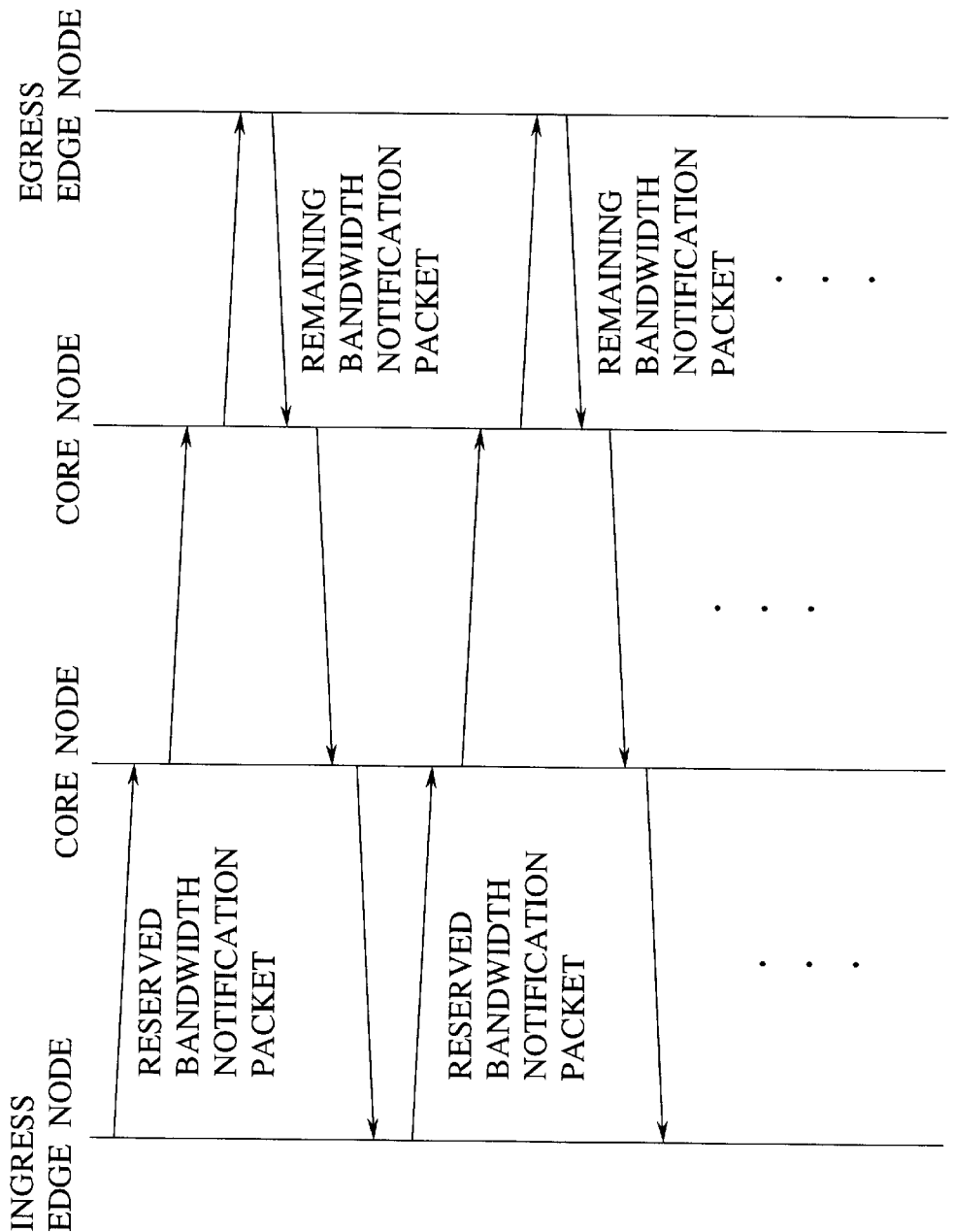
FIG. 18 is a sequence chart for an exemplary message sequence according to the third embodiment of the present invention.

FIG. 18 shows an exemplary message sequence in this third embodiment. The ingress edge node transmits the reserved bandwidth notification packet toward the downstream side core node. Then, the core node that received this packet registers the flow group identifier and its allocated bandwidth indicated in this packet into the reserved bandwidth management table of FIG. 10, and transfers a new reserved bandwidth notification packet to the further downstream side. This is basically the same as in the second embodiment.

On the other hand, the egress edge node transmits the remaining bandwidth notification packet. The core node that received this remaining bandwidth notification packet judges whether the received link is the output link of the flow group described in that packet, and if it is the output link, the value of the remaining bandwidth described in this packet and the value of the remaining bandwidth at the own node are compared, and the remaining bandwidth notification packet with the smaller one of these written therein is transmitted toward all the links other than the received link.

Note that FIG. 18 depicts as if the transmission of the remaining bandwidth notification packet takes place upon receiving the remaining bandwidth notification packet from the downstream side node, but it is possible for each node inside the network to transmit the remaining bandwidth notification packet periodically at independent timing. In such a case, as values (flow group identifier, remaining bandwidth, etc.) to be written into the remaining bandwidth notification packet, the values written into the previously transmitted remaining bandwidth notification packet are stored and the same previously used values can be used as long as the amount of reserved bandwidth is unchanged. Note that a node which learned that the amount of reserved bandwidth has changed from the reserved bandwidth notification packet should preferably transmit a new remaining bandwidth notification packet immediately. The transmission targets of the remaining bandwidth notification packet can be neighboring nodes of the communication links other than the output link that corresponds to the flow group indicated by the flow group identifier field of the remaining bandwidth notification packet to be transmitted.

An exemplary configuration of the edge node in this third embodiment is the same as that shown in FIG. 12 and FIG. 13. However, in this third embodiment, the bandwidth management and packet processing unit 1301 of the edge node carries out the following operation in addition to the operation described in the second embodiment.

Namely, when the reserved bandwidth notification packet arrives at the packet reception unit 1201, this packet is given to the bandwidth management and packet processing unit 1301. The bandwidth management and packet processing unit 1301 of the (egress) edge node stores the reserved bandwidth described in this reserved bandwidth notification packet, while calculating and storing the remaining bandwidth. Then, the remaining bandwidth notification packet with this stored remaining bandwidth written therein is given to the packet transmission unit 1203. The packet transmission unit 1203 carries out an appropriate transmission processing with respect to the remaining bandwidth notification packet as well as to the data packet given from the packet transfer unit 1302 and the reserved bandwidth notification packet given from the bandwidth management and packet processing unit 1301, and transmits them to the desired output links.

An exemplary configuration of the core node in this third embodiment is the same as that shown in FIG. 12 and FIG. 14. However, in this third embodiment, the bandwidth management and packet processing unit 1401 of the core node carries out the following operation in addition to the operation described in the second embodiment.

Namely, when the remaining bandwidth notification packet arrives at the packet reception unit 1201, this packet is given to the bandwidth management and packet processing unit 1401. The bandwidth management and packet processing unit 1401 of the core node stores the flow group identifier and its remaining bandwidth described in this remaining bandwidth notification packet. Alternatively, the bandwidth management and packet processing unit 1401 may store the flow group identifier and its remaining bandwidth of the remaining bandwidth notification packet to be transmitted according to the content described in the received remaining bandwidth notification packet.

When these stored values differ from the values of the remaining bandwidth notification packet that was previously received or transmitted, the remaining bandwidth notification packet reflecting the change of the values in the received remaining bandwidth notification packet is immediately given to the packet transmission unit 1203. Here, not only when the values in the remaining bandwidth notification packet received from the downstream side node changes as such, but also when the values in the reserved bandwidth notification packet received from the upstream side node changes, it is possible to obtain the change in the remaining bandwidth corresponding to the change in the amount of reserved bandwidth and give a new remaining bandwidth notification packet to the packet transmission unit 1203.

In addition, when a prescribed period of time has elapsed since the packet is transmitted previously, the remaining bandwidth notification packet produced by referring to the stored flow group identifier and its remaining bandwidth is given to the packet transmission unit 1203. The packet transmission 1203 carries out an appropriate transmission processing with respect to the remaining bandwidth notification packet given from the bandwidth management and packet processing unit 1401, and transmits it to the desired output links.

Figure 19:
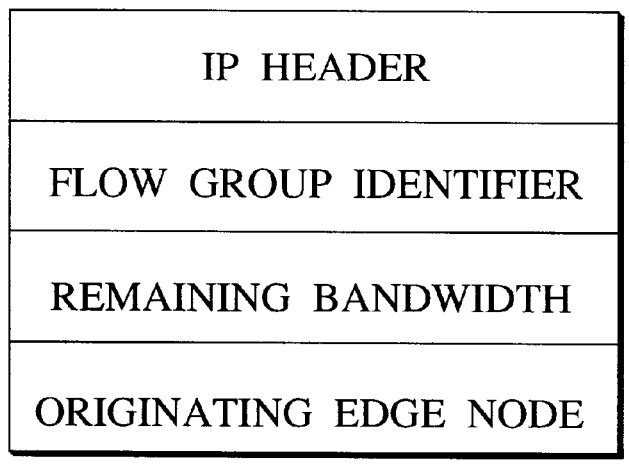
FIG. 19 is a diagram showing an exemplary format of a remaining bandwidth probing packet used in the fourth embodiment of the present invention.
Figure 20:
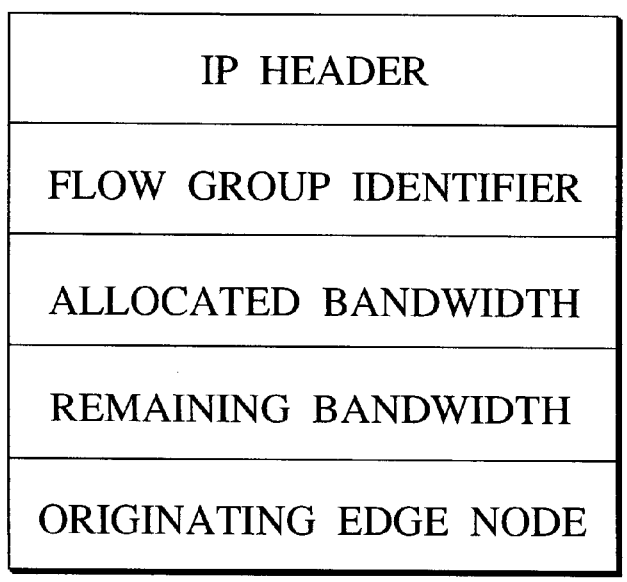
FIG. 20 is a diagram showing an exemplary format of a bandwidth management packet that can be used in the fourth embodiment of the present invention.
Figure 21:
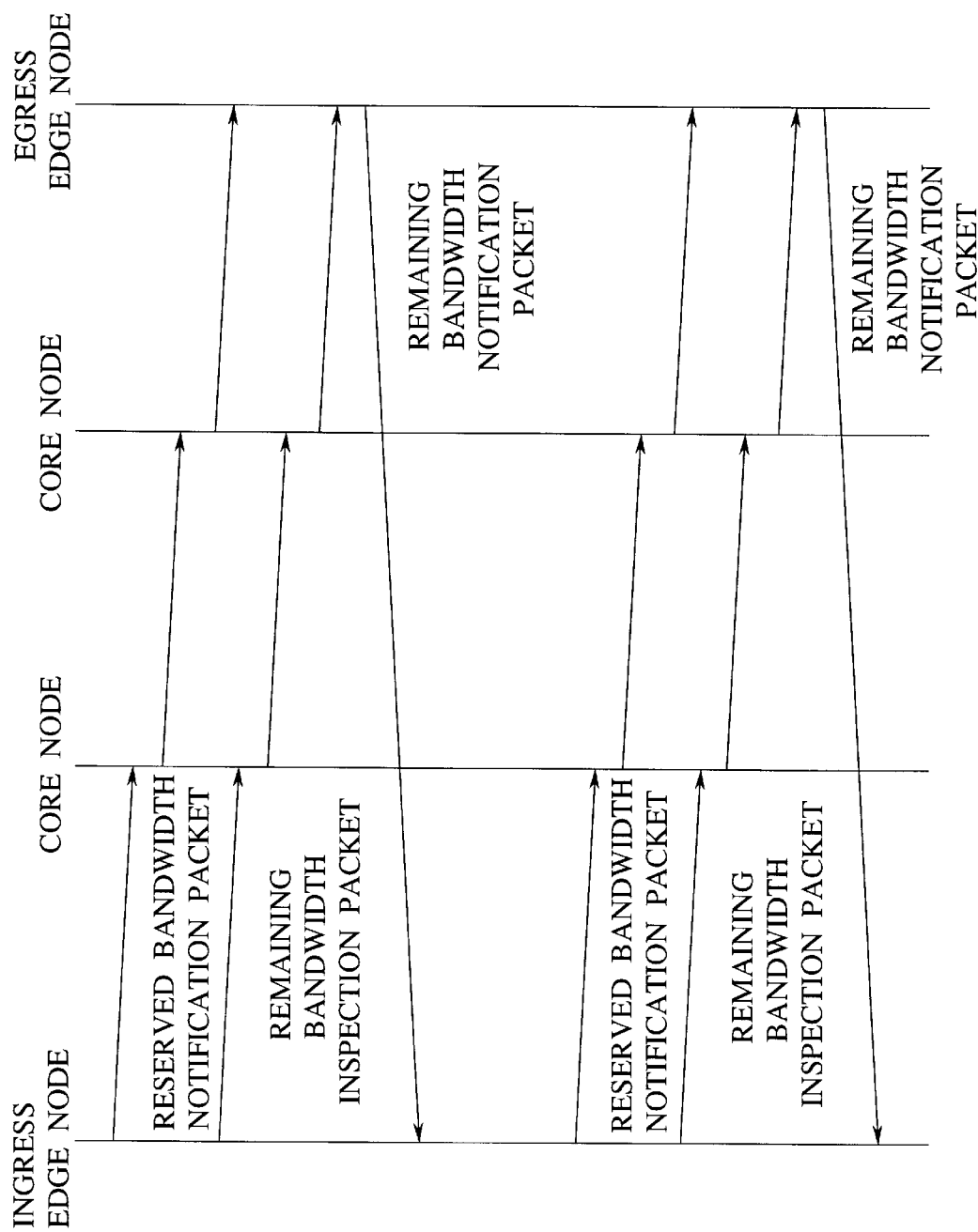
FIG. 21 is a sequence chart for an exemplary message sequence according to the third embodiment of the present invention.

Referring now to FIG. 19 to FIG. 21, the fourth embodiment of a communication resource management method and a node device according to the present invention will be described in detail.

This fourth embodiment enables the ingress edge node to carry out the admission control with respect to a new bandwidth reservation request dynamically according to the bandwidth that is actually remaining on the route at each moment, in a manner different from the third embodiment described above.

The edge node transmits a remaining bandwidth probing packet with the flow group identifier, a value of the remaining bandwidth of the output link for that flow group at the own node, and an address of an originating edge node (the own node) described therein, to one of the destination addresses of the flows belonging to that flow group. The core node on the route that received this remaining bandwidth probing packet compares the remaining bandwidth described in the received remaining bandwidth probing packet and the remaining bandwidth with respect to that flow group at the own node, and if the remaining bandwidth at the own node is smaller, the core node transmits the remaining bandwidth probing packet by overwriting the remaining bandwidth at the own node. By repeating this operation, the edge node at the egress side of the network can ascertain the bandwidth that is remaining on the route between the originating edge node that transmitted the remaining bandwidth probing packet and the own node. By notifying this remaining bandwidth to the originating edge node, the originating edge node can ascertain the remaining bandwidth on the route and make a judgement as to whether or not to accept a new bandwidth reservation request according to the ascertained remaining bandwidth.

FIG. 19 shows an exemplary format of the remaining bandwidth probing packet. Here, the remaining bandwidth probing packet is to be transmitted as an IP packet, and comprises an IP header, a flow group identifier field, a remaining bandwidth field, and an originating edge node field. A value indicating the remaining bandwidth probing target flow group is described in the flow group identifier field, and an address of an edge node that transmitted this remaining bandwidth probing packet is described in the originating edge node field. The remaining bandwidth probing packet will be transferred while the remaining bandwidth field is rewritten at intermediate core nodes.

A value indicating that it is the remaining bandwidth probing packet is written into the Protocol field of the IP header. The node on the route checks the value of the Protocol field at a time of carrying out the transfer processing, and if the received packet is the remaining bandwidth probing packet, the packet is transferred after the processing for rewriting the remaining bandwidth as mentioned above is carried out, instead of carrying out the usual packet transfer.

Now, a concrete example of the procedure as described above will be described for an exemplary case of the network 304 shown in FIG. 16. First, the edge node 203 transmits the remaining bandwidth probing packet in which (193.20.20.0, 255.255.255.0, 0.0.0.0, 0.0.0.0) is described as (destination address, destination network mask, source address, source network mask) in the flow group identifier field and the remaining bandwidth 2000 [Kbps] of the own node is described in the remaining bandwidth field, to the core node 103 which is the next hop node for this flow group.

Upon receiving this remaining bandwidth probing packet, the core node 103 checks the output link of this flow group indicated by this flow group identifier, and obtains the remaining bandwidth of 800 [Kbps] by looking up the remaining bandwidth management table of FIG. 17 by using this output link as a key. Then, the core node 103 compares the remaining bandwidth 800 [Kbps] of the own node and the remaining bandwidth 2000 [Kbps] described in the received remaining bandwidth probing packet, and writes the smaller one,. i.e., 800 [Kbps], into the remaining bandwidth field of a remaining bandwidth probing packet to be transmitted, and transmits this remaining bandwidth probing packet to the core node 102 which is the next hop node for the above described flow group.

Upon receiving this remaining bandwidth probing packet, the core node 102 compares the remaining bandwidth 1000 [Kbps] of the own node and the remaining bandwidth 800 [Kbps] described in the received remaining bandwidth probing packet, writes the smaller one, i.e., 800 [Kbps], into the remaining bandwidth field of a remaining bandwidth probing packet to be transmitted, and transmits this remaining bandwidth probing packet to the edge node 202 which is the next hop node for the above described flow group.

Upon receiving this remaining bandwidth probing packet, the edge node 202 compares the remaining bandwidth 900 [Kbps] of the own node and the remaining bandwidth 800 [Kbps] described in the received remaining bandwidth probing packet, and chooses the smaller one such that it is ascertained that the remaining bandwidth of 800 [Kbps] is available on the route between the edge node 203 and the own node. The edge node 202 then transmits a remaining bandwidth notification packet in which this ascertained remaining bandwidth value is written in correspondence to the flow group identifier (or the address of the originating edge node 203 or the address of the own node 202), to the edge node 203 that transmitted the remaining bandwidth probing packet. In this way, the edge node 203 ascertains that the remaining bandwidth of 800 [Kbps] is available on the route inside the network 304 for the flow group indicated by the flow group identifier (193.20.20.0, 255.255.255.0, 0.0.0.0, 0.0.0.0).

By the similar procedure, the edge node 201 ascertains that the remaining bandwidth of 500 [Kbps] is available on the route of the packets with the destination network address 193.20.0.0, and the edge node 204 ascertains that the remaining bandwidth of 200 [Kbps] is available.

In this way, it becomes possible for the edge node 203, for example, to make a Judgement as to whether or not to accept the bandwidth reservation request upon newly receiving the bandwidth reservation request for the flow with the destination network address 193.20.20.2 according to whether the requested bandwidth is smaller than 800 [Kbps] or not.

When each edge node transmits the above described remaining bandwidth probing packet periodically, the remaining bandwidth notification packet will be returned from the egress edge node in response, so that each edge node can ascertain the change in the remaining bandwidth.

Alternatively, it is also possible to transmits the remaining bandwidth probing packet for a flow group that contains a flow for which the bandwidth reservation is requested, when a new bandwidth reservation request arrives at the edge node, and the judgement as to whether or not to accept the received bandwidth reservation request is made after checking the remaining bandwidth of the route.

It is also possible to transmit the remaining bandwidth probing packet toward the next hop node of the route for the flow group, instead of transmitting it by attaching one of the destination addresses of the flows belonging to that flow group. In such a case, the node that received this remaining bandwidth probing packet determines the destination of the remaining bandwidth probing packet to be transmitted by the own node next, that is, the next hop node, from the flow group identifier described in the packet and the routing table at the own node.

It is also possible to use a single packet that plays the both roles of the remaining bandwidth probing packet and the reserved bandwidth notification packet, instead of using the remaining bandwidth probing packet as a message different from the reserved bandwidth notification packet as described above.

FIG. 20 shows an exemplary format of such a bandwidth management packet that plays the both roles of the remaining bandwidth probing packet of this fourth embodiment and the reserved bandwidth notification packet of the second embodiment described above. Here, the bandwidth management packet is to be transmitted as an IP packet, and comprises an IP header, a flow group identifier field, an allocated bandwidth field, a remaining bandwidth field, and an originating edge node field. A value indicating the bandwidth management target flow group of this packet is described in the flow group identifier field, a bandwidth allocated to this flow group by the edge node is described in the allocated bandwidth field, and an address of an edge node that transmitted this bandwidth management packet is described in the originating edge node field.

The node that received this bandwidth management packet maintains the reserved bandwidth management table sing the value described in the allocated bandwidth field, while obtaining the remaining bandwidth from the remaining bandwidth management table, and transmits the bandwidth management packet with the remaining bandwidth of the own node written therein when the remaining bandwidth of the own node is smaller than the remaining bandwidth of the received bandwidth management packet.

Note that this bandwidth management packet may be transmitted to the next hop node, or toward the destination of one of the flows belonging to the flow group indicated by the flow group identifier with a provision of writing a value indicating that it is the bandwidth management packet in the Protocol field of the IP header. In the latter case, at the intermediate node, an IP packet with the the value indicating that it is the bandwidth management packet written in the Protocol field of the IP header will be transferred after carrying out the above described processing, instead of simply transferring it.

FIG. 21 shows an exemplary message sequence in this fourth embodiment. The ingress edge node transmits the reserved bandwidth notification packet toward the downstream side core node. Then, the core node that received this packet registers the flow group identifier and its allocated bandwidth indicated in this packet, and transfers this packet to the further downstream side. This is basically the same as in the second embodiment.

In addition, the ingress edge node transmits the remaining bandwidth probing packet toward the downstream side core node. Then, the core node that received this packet transfers the remaining bandwidth probing packet with the smaller one of the remaining bandwidth written in the received packet and the remaining bandwidth that can be allocated to that flow group at the own node described therein, to the downstream side of the flow group.

Note that FIG. 21 depicts as if the transmission of the remaining bandwidth probing packet takes place upon receiving the remaining bandwidth probing packet from the upstream side node, but it is possible for each node inside the network to transmit the remaining bandwidth probing packet periodically at independent timing. In such a case, as values to be written into the remaining bandwidth probing packet, the values written into the previously transmitted remaining bandwidth probing packet will be used as long as the bandwidth reservation state is unchanged.

When the egress edge node receives the remaining bandwidth probing packet, the remaining bandwidth described in this packet and the remaining bandwidth for this flow group at the own node are compared, and the smaller one is notified to the ingress edge node that transmitted this packet.

An exemplary configuration of the edge node in this fourth embodiment is the same as that shown in FIG. 12 and FIG. 13. However, in this fourth embodiment, the bandwidth management and packet processing unit 1301 of the edge node carries out the following operation in addition to the operation described in the second embodiment.

Namely, at the ingress edge node, for each flow group, the remaining bandwidth probing packet with the remaining bandwidth at the own node and its flow group identifier described therein is given to the packet transmission unit 1203. At the egress edge node, when the remaining bandwidth probing packet arrives at the packet reception unit 1201, this packet is given to the bandwidth management and packet processing unit 1301, where the remaining bandwidth of the flow group described in this packet and the remaining bandwidth for that flow group at the own node are compared, and the remaining bandwidth notification packet with the smaller one written therein which is destined to the ingress edge node is given to the packet transmission unit 1203. The packet transmission unit 1203 carries out appropriate transmission processing with respect to the data packet that is given from the packet transfer unit 1302 and the reserved bandwidth notification packet, the remaining bandwidth probing packet, and the remaining bandwidth notification packet that are given from the bandwidth management and packet processing unit 1301, and transmits them to the desired output links.

An exemplary configuration of the core node in this fourth embodiment is the same as that shown in FIG. 12 and FIG. 14. However, in this fourth embodiment, the bandwidth management and packet processing unit 1401 of the core node carries out the following operation in addition to the operation described in the second embodiment.

Namely, when the remaining bandwidth probing packet arrives at the packet reception unit 1201, the packet reception unit 1201 gives this packet to the bandwidth management and packet processing unit 1401. The bandwidth management and packet processing unit 1401 compares the remaining bandwidth of the flow group described in this packet and the remaining bandwidth for that flow group at the own node, and gives the remaining bandwidth notification packet with the smaller one written therein to the packet transmission unit 1203. The packet transmission unit 1203 carries out appropriate transmission processing with respect to the data packet or the remaining bandwidth notification packet that is given from the packet transfer unit 1302 and the reserved bandwidth notification packet or the remaining bandwidth probing packet that is given from the bandwidth management and packet processing unit 1301, and transmits them to the desired output links.

Figure 22:
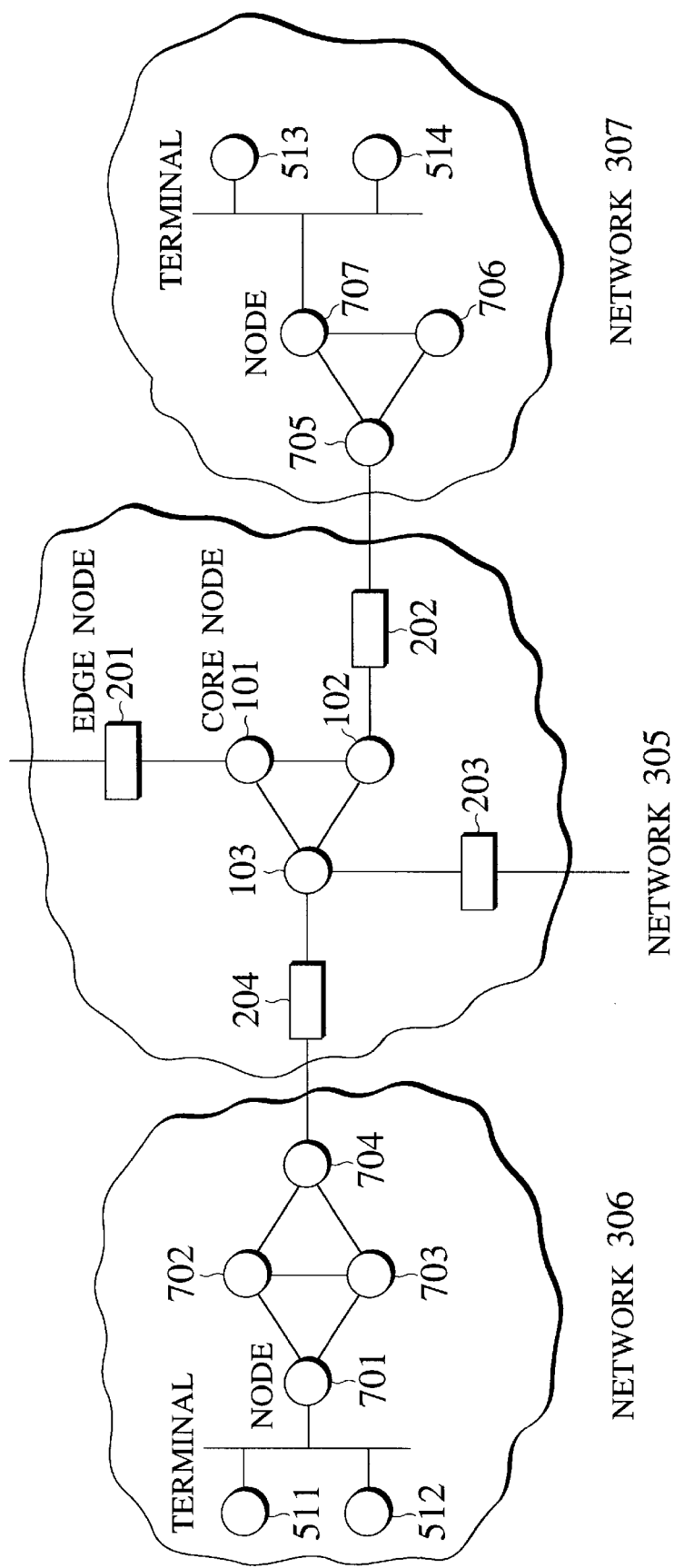
FIG. 22 is a schematic diagram showing an exemplary configuration of a network for realizing a packet transfer procedure according to the fifth embodiment of the present invention.

Referring now to FIG. 22, the fifth embodiment of a communication resource management method and a node device according to the present invention will be described in detail.

This fifth embodiment is directed to an example where the present invention is applied to to the bandwidth management in the case of carrying out the bandwidth reservation on a route between a transmitting terminal and a receiving terminal using RSVP (Resource reSerVation Protocol).

In this fifth embodiment, the node other than the edge node does not carry out the RSVP processing regarding RSVP messages and carries out only the usual IP transfer. The edge node compares the bandwidth requested by the RSVP message and the remaining bandwidth on the route that is comprehended by the procedure of the first, third or fourth embodiment, and makes a judgement as to whether or not to accept the bandwidth reservation request notified by RSVP. In the case of accepting the bandwidth reservation request, the edge node notifies that the bandwidth reservation request is newly accepted to the nodes inside the network using the reserved bandwidth notification packet. Also. the edge node attaches a tag indicating the high priority level to the packets of the corresponding flow, at a rate corresponding to the reserved bandwidth. The node other than the edge node does not carry out the packet priority control (or scheduling) that accounts for the flow, and carries out only the priority control according to the tag for indicating the priority level in the packet.

Here, RSVP is a protocol for notifying the bandwidth reservation request, which is currently in a process of being standardized at the IETF. In RSVP, the transmitting terminal notifies the transmission traffic characteristic to the network and the receiving terminal by using a control message called Path message, and the receiving terminal notifies the required bandwidth to the network by using a control message called Resv message.

The transmitting terminal can send the Path message and the data packet through the same route by transmitting the Path message with the same destination address as the destination address of the data packet. The node on the route writes the address of the own node into the Path message, so that the node on the route can ascertain the address of the previous hop node.

On the other hand, the receiving terminal transmits the Resv message in order to request the bandwidth reservation to the network. As the Resv message is sequentially transferred on the route toward the previous hop node, the bandwidth reservation request reaches to the all nodes on the route.

Now, a concrete example of the procedure as described above will be described for an exemplary case of networks 305–307 shown in FIG. 22. In FIG. 22, a network 306 containing terminals 511–512 and nodes 701–704 and a network 307 containing terminals 513–514 and nodes 705–707 are connected to a network 305 containing edge nodes 201–204 and core nodes 101–103. Each of the nodes 701–707 inside the networks 306 and 307 has a function for processing RSVP messages and a packet scheduler, such that the communication quality can be guaranteed to each flow from which the bandwidth reservation request is accepted.

On the other hand, in the network 305, only each of the edge nodes 201–204 has a function for processing RSVP messages, and each of the core nodes 101–103 simply transfers RSVP messages. Each of the edge nodes 201–204 of the network 305 is notified about the remaining bandwidth for each flow group, by obtaining the remaining bandwidth for each flow group statically as in the first embodiment, or by receiving the remaining bandwidth notification packet as in the third embodiment, or else by using the remaining bandwidth probing packet as in the fourth embodiment.

For example, suppose that the terminal 511 transmitted the Path messages of RSVP and data packets to the terminal 513, and the terminal 513 transmitted the Resv messages in response. Assuming that the data packets from the terminal 511 to the terminal 513 is transferred by the route of the node 701, the node 702, the node 704, the edge node 204, the core node 103, the core node 102, the edge node 202, the node 705, the node 707 and the terminal 513, the Path messages transmitted by the terminal 511 will be processed at the nodes 701, 702 and 704, the edge nodes 204 and 202, and the nodes 705 and 707. The core nodes 103 and 102 simply transfer the Path messages so that the previous hop node field of the Path messages received at the edge node 202 has the address of the edge node 204 (rather than that of the core node 102). The Resv messages transmitted by the terminal 513 will be transferred hop-by-hop through the node 707, the node 705, the edge node 202, the edge node 204, the node 704, the node 702, and the node 701 in this order.

The terminals 511 and 513 makes the bandwidth reservation request for 100 [Kbps] with respect to a TCP session of the source port number 10000 and the destination port number 20000 using RSVP, and when this bandwidth reservation request is accepted, each of the nodes 701, 702, 704, 705, and 707 inside the networks 306 and 307 guarantees the bandwidth of 100 [Kbps] with respect to this flow, that is, the flow of packets having an IP header in which the destination address is the terminal 513, the destination port number is 20000, the source address is the terminal 511, the source port number is 10000, and the protocol number is a value indicating TCP, using the packet scheduler provided in the own node.

On the other hand, in the network 305, the edge node 204 knows the remaining bandwidth on the route for the flow group directed toward the network 307 by the procedure of the first, third or fourth embodiment. Then, when the edge node 204 receives the bandwidth reservation request for 100 [Kbps], for example, using RSVP, this bandwidth reservation request is accepted only when this value is smaller than the remaining bandwidth on the route for the flow group that contains the flow in which the destination address is the terminal 513, the destination port number is 20000, the source address is the terminal 511, the source port number is 10000, and the protocol number is a value indicating TCP. Also, when the bandwidth reservation request is accepted, the edge node 204 attaches a tag indicating the high priority level to this flow, that is, packets having an IP header in which the destination address is the terminal 513, the destination port number is 20000, the source address is the terminal 511, the source port number is 10000, and the protocol number is a value indicating TCP, at the rate of 100 [Kbps]. Each of the core nodes 103 and 102 of the network 305 carries out the priority control processing according to the tag indicating the priority level that is described in the packet at a time of transferring the packet.

In this way, in this fifth embodiment, it suffices for the core nodes 101–103 of the network 305 to carry out the priority control processing according to only the tag indicating the priority level in the packet, without carrying out the RSVP message processing or the packet priority control (or scheduling) that accounts for the flow, so that the processing load on these core nodes can be reduced. At the same time, it is possible to realize the end-to-end communication quality from the transmitting terminal 511 to the receiving terminal 513, as requested by using RSVP.

As described, according to the present invention, it becomes possible to guarantee the communication quality with respect to the flow, while the node other than the edge node of the network is not required to carry out the processing for each flow that exerts the high processing load.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing communication resources in a network containing edge nodes located at a boundary of the network and core nodes located inside the network, comprising the steps of:

(a) storing at one edge node an information for obtaining an available amount of communication resources that can be newly allocated in the network to one set of flows which share at least a route from said one edge node to an egress node of the network;

(b) carrying out an admission control at said one edge node by newly receiving a request for allocation of communication resources for one flow belonging to said one set of flows, judging whether or not to accept the request according to a requested amount of communication resources and the available amount of communication resources as obtained from the information stored at the step (a) for said one set of flows, and allocating requested communication resources to said one flow when it is judged that the request is to be accepted; and (c) transmitting packets at said one edge node by describing a priority level in each packet according to an amount of communication resources allocated to a flow of the packets at the step (b), such that a core node carries out a transfer processing with respect to received packets according to the priority level described in each received packet, wherein at the step (b), said one edge node interprets a received packet in a resource reservation protocol, and allocates communication resources by using the resource reservation protocol to said one flow indicated by the resource reservation protocol, and at the step (c), each core node transfers a resource reservation protocol packet without interpreting the resource reservation protocol packet.

2. A method for managing communication resources in a network containing edge nodes located at a boundary of the network and core nodes located inside the network, comprising the steps of:

(a) carrying out a priority control in which an edge node transmits packets by describing a priority level in each packet according to an amount of communication resources allocated to a flow of the packets, and a core node carries out a transfer processing with respect to received packets according to the priority level described in each received packet;

(b) transmitting from one edge node a notification regarding an amount of communication resources allocated to a set of flows which include one flow and which share at least a route from said one edge node to an egress node of the network, according to an amount of communication resources allocated to said one flow;

(c) receiving the notification at one core node and calculating an amount of communication resources to be consumed at said one core node according to the notification; and (d) interpreting a received packet in a resource reservation protocol, and allocating communication resources requested by using the resource reservation protocol to said one flow indicated by the resource reservation protocol, at said one edge node, wherein at the step (a), each core node transfers a resource reservation protocol packet without interpreting the resource reservation protocol packet.

3. A method for managing communication resources in a network containing edge nodes located at a boundary of the network and core nodes located inside the network, comprising the steps of:

(a) carrying out a priority control in which an edge node transmits packets by describing a priority level in each packet according to an amount of communication resources allocated to a flow of the packets, and a core node carries out a transfer processing with respect to received packets according to the priority level described in each received packet;

(b) transmitting from one edge node an allocated resource notification regarding an amount of communication resources allocated to one set of flows which include one flow and which share at least a route from said one edge node to an egress node of the network, according to an amount of communication resources allocated to said one flow;

(c) sequentially transmitting a remaining resource notification regarding a remaining amount of communication resources that can be newly allocated to some set of flows at each node, which is obtained according to the allocated resource notification transmitted from said one edge node and a transfer capability of said each node, from the egress node through any intermediate core codes, toward an upstream side of said one set of flows;

(d) obtaining at said one edge node an available amount of communication resources that can be newly allocated in the network to said one set of flows, according to the remaining resource notification received from a neighboring core node on a downstream side of said one set of flows; and (e) interpreting a received packet in a resource reservation protocol, and allocating communication resources requested by using the resource reservation protocol to said one flow indicated by the resource reservation protocol, at said one edge node, wherein at the step (a), each core node transfers a resource reservation protocol packet without interpreting the resource reservation protocol packet.

4. A method for managing communication resources in a network containing edge nodes located at a boundary of the network and core nodes located inside the network, comprising the steps of:

(a) carrying out a priority control in which an edge node transmits packets by describing a priority level in each packet according to an amount of communication resources allocated to a flow of the packets, and a core node carries out a transfer processing with respect to received packets according to the priority level described in each received packet;

(b) transmitting from one edge node an allocated resource notification regarding an amount of communication resources allocated to one set of flows which include one flow and which share at least a route from said one edge node to an egress node of the network;

(c) sequentially transmitting a remaining resource notification regarding a remaining amount of communication resources that can be newly allocated to said one set of flows at each node, which is obtained at said each node according to the amount of communication resources allocated to said one flow by said one edge node or the allocated resource notification transmitted from said one edge node and a transfer capability of said each node, from said one edge node through any intermediate core codes, toward a downstream side of said one set of flows;

(d) notifying from the egress node to said one edge node an available amount of communication resources that can be newly allocated in the network to said one set of flows, which is obtained according to the allocated resource notification transmitted from said one edge node, a transfer capability of the egress node, and the remaining resource notification received from a neighboring core node on an upstream side of said one set of flows; and (e) interpreting a received packet in a resource reservation protocol, and allocating communication resources requested by using the resource reservation protocol to said one flow indicated by the resource reservation protocol, at said one edge node, wherein at the step (a), each core node transfers a resource reservation protocol packet without interpreting the resource reservation protocol packet.

* * * * *